(12) United States Patent
Shimizu et al.

(10) Patent No.: US 10,586,440 B2
(45) Date of Patent: Mar. 10, 2020

(54) ANTI-THEFT MANAGEMENT DEVICE, ANTI-THEFT MANAGEMENT SYSTEM, ANTI-THEFT MANAGEMENT METHOD, AND PROGRAM

(71) Applicant: NEC CORPORATION, Tokyo (JP)

(72) Inventors: Yuta Shimizu, Tokyo (JP); Hidenori Tsukahara, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/327,457

(22) PCT Filed: May 23, 2017

(86) PCT No.: PCT/JP2017/019235
§ 371 (c)(1),
(2) Date: Feb. 22, 2019

(87) PCT Pub. No.: WO2018/042774
PCT Pub. Date: Mar. 8, 2018

(65) Prior Publication Data
US 2019/0202400 A1    Jul. 4, 2019

(30) Foreign Application Priority Data

Aug. 31, 2016 (JP) ................ 2016-169694

(51) Int. Cl.
*G08B 25/00* (2006.01)
*G08B 25/10* (2006.01)
(Continued)

(52) U.S. Cl.
CPC ............ *G08B 25/00* (2013.01); *G08B 25/10* (2013.01); *B60R 25/102* (2013.01);
(Continued)

(58) Field of Classification Search
CPC ..... B60R 25/00; B60R 25/001; B60R 25/102; B60R 25/104; B60R 25/30; B60R 25/305;
(Continued)

(56) References Cited

U.S. PATENT DOCUMENTS 7,015,792 B2 * 3/2006 Lessard ............... B60R 25/04
340/426.11
7,091,821 B2 * 8/2006 Lessard ............... B60R 25/04
340/426.11
(Continued)

FOREIGN PATENT DOCUMENTS

JP    8-301073 A    11/1996
JP    2001-184581 A    7/2001
(Continued)

OTHER PUBLICATIONS

International Search Report for PCT/JP2017/019235 dated Aug. 15, 2017 [PCT/ISA/210].

*Primary Examiner* — Van T Trieu
(74) *Attorney, Agent, or Firm* — Sughrue Mion, PLLC

(57) ABSTRACT

An anti-theft management device includes a notification information-transmitting unit that transmits notification information to vehicles located within a communicable range when the notification information is not able to be transfer to a set theft notification destination and when it is determined that identification information of a determination target vehicle coincides with identification information of a stolen vehicle on the basis of theft information including the identification information of the stolen vehicle.

11 Claims, 14 Drawing Sheets

(51) Int. Cl.
  *B60R 25/33*    (2013.01)
  *H04M 11/04*   (2006.01)
  *B60R 25/102*  (2013.01)
  *B60R 25/30*   (2013.01)

(52) U.S. Cl.
  CPC ............ *B60R 25/302* (2013.01); *B60R 25/33* (2013.01); *H04M 11/04* (2013.01)

(58) Field of Classification Search
  CPC .... G08B 25/00; G08B 25/001; G08B 25/005; G08B 25/006; G08B 25/007; G08B 25/10
  See application file for complete search history.

(56) References Cited

U.S. PATENT DOCUMENTS

| | | | | |
|---|---|---|---|---|
| 2004/0075553 A1* | 4/2004 | Ono | ................... | B60R 25/1012 340/539.13 |
| 2004/0201460 A1* | 10/2004 | Bucholz | ................. | B60R 25/10 340/426.1 |
| 2006/0022809 A1* | 2/2006 | Lessard | ................... | B60R 25/04 340/426.1 |

FOREIGN PATENT DOCUMENTS

| | | | |
|---|---|---|---|
| JP | 2002-207821 | A | 7/2002 |
| JP | 2003-109194 | A | 4/2003 |
| JP | 2003-196764 | A | 7/2003 |
| JP | 2004-161178 | A | 6/2004 |
| JP | 2007-124480 | A | 5/2007 |
| JP | 2008-037414 | A | 2/2008 |
| JP | 2009-93592 | A | 4/2009 |
| KR | 10-2007-0020927 | A | 2/2007 |
| KR | 1580416 | * | 12/2014 |

\* cited by examiner

ANTI-THEFT MANAGEMENT DEVICE, ANTI-THEFT MANAGEMENT SYSTEM, ANTI-THEFT MANAGEMENT METHOD, AND PROGRAM

CROSS REFERENCE TO RELATED APPLICATIONS

This application is a National Stage of International Application No. PCT/JP2017/019235, filed on May 23, 2017, which claims priority from Japanese Patent Application No. 2016-169694, filed on Aug. 31, 2016, the contents of all of which are incorporated herein by reference in their entirety.

TECHNICAL FIELD

The present invention relates to an anti-theft management device, an anti-theft management system, an anti-theft management method, and a program.

BACKGROUND ART

There are technologies in which identification information of a stolen vehicle is transmitted to vehicles, and a vehicle that has received the identification information determines whether or not the vehicle itself is a stolen vehicle and notifies a management center or the like of a result of the determination.

For example, in an invention disclosed in Patent Literature 1, a management center transmits a vehicle search signal including a registration number of a vehicle that has been stolen to a communication satellite, and the communication satellite transmits the information nationwide. The stolen vehicle that has received the vehicle search signal detects its own location using the GPS and replies to the communication satellite using the location information together with a location notification signal, and the communication satellite transmits the location notification signal to the management center. Then, the management center notifies the police of the location information.

In addition, in an invention disclosed in Patent literature 2, a theft prevention device mounted in a vehicle is configured to transmit radio waves having a specific frequency when a specific ID number is detected. When a vehicle is stolen, a cellular phone or the like transmits a specific ID number to the theft prevention device and receives a signal from the theft prevention device, whereby the stolen vehicle is detected.

CITATION LIST

Patent Literature

[Patent Literature 1]
 Japanese Unexamined Patent Application. First Publication No. 2003-109194
[Patent Literature 2]
 Japanese Unexamined Patent Application, First Publication No. 2004-161178

SUMMARY OF INVENTION

Technical Problem

In a case in which an in-vehicle device or the like has detected that a vehicle is a stolen vehicle, there is a possibility that communication with a set theft notification destination cannot be established. Even in such a case, it is preferable to provide a notification to the theft notification destination. However, neither of Patent Literatures 1 and 2 illustrates a countermeasure for a case in which communication with a set theft notification destination cannot be established.

In the invention disclosed in Patent Literature 1, a management center and a vehicle communicate with each other through a communication satellite. From a viewpoint of simplifying the system configuration, it is preferable to provide a theft notification to a theft notification destination without using a communication satellite. Further, it is preferable to provide a notification to the theft notification destination even in a case in which an in-vehicle device or the like cannot establish communication with the theft notification destination.

In the invention disclosed in Patent Literature 2, when a theft prevention device transmits radio waves having a specific frequency after a cellular phone transmits a specific ID number to the theft prevention device, there is a possibility of the theft prevention device being unable to establish communication with the cellular phone. For example, in a case in which the theft prevention device is located outside a communicable range of the cellular phone or the like, the theft prevention device cannot establish communication with the cellular phone. Also in such a case, it is preferable to provide a notification to the theft notification destination.

An object of the present invention is to provide an anti-theft management device, an anti-theft management system, an anti-theft management method, and a program capable of solving the problems described above.

Solution to Problem

According to a first aspect of the present invention, an anti-theft management device is provided, including a notification information-transmitting unit that transmits notification information to a vehicle located within a communicable range when the notification information is not able to be transferred to a set theft notification destination and when it is determined that identification information of a determination target vehicle coincides with identification information of a stolen vehicle on the basis of theft information including the identification information of the stolen vehicle.

According to a second aspect of the present, an anti-theft management system is provided, including: a theft information-transmitting device; and an anti-theft management device. The theft information-transmitting device transmits theft information including identification information of a stolen vehicle. The anti-theft management device includes: a theft information-receiving unit that receives the theft information; a theft-determining unit that determines whether or not identification information of its own vehicle in which the anti-theft management device is mounted coincides with the identification information of the stolen vehicle; and a notification information-transmitting unit that transmits notification information to vehicles located within a communicable range when it is determined that identification information of its own vehicle coincides with the identification information of the stolen vehicle and when the notification information is not able to be transferred to a set theft notification destination.

According to a third aspect of the present invention, an anti-theft management system includes: a theft information-transmitting device; a relay device; and an anti-theft management device. The theft information-transmitting device transmits theft information including identification information of a stolen vehicle using broadcast waves. The relay device receives the theft information from the theft information-transmitting device and relays the received theft information to the anti-theft management device. The anti-theft management device includes: a theft information-receiving unit that receives the theft information from the relay device; a theft-determining unit that determines whether or not identification information of its own vehicle in which the anti-theft management device is mounted coincides with the identification information of the stolen vehicle; and a notification information-transmitting unit that transmits notification information to a vehicle located within a communicable range when it is determined that identification information of its own vehicle coincides with the identification information of the stolen vehicle and when the notification information is not able to be transferred to a set theft notification destination.

According to a fourth aspect of the present invention, an anti-theft management system is provided, including: a theft information-transmitting device; a first anti-theft management device; and a second anti-theft management device. The theft information-transmitting device transmits theft information including identification information of a stolen vehicle using broadcast waves. The first anti-theft management device includes: a theft information-receiving unit that receives the theft information; an identification information request-transmitting unit that transmits a transmission request for transmission of identification information of a vehicle in which the second anti-theft management device is mounted; an identification information-receiving unit that receives the identification information of the vehicle in which the second anti-theft management device is mounted; a theft-determining unit that determines whether or not the identification information of the vehicle in which the second anti-theft management device is mounted coincides with the identification information of the stolen vehicle; and a notification information-transmitting unit that transmits notification information to vehicles located within a communicable range when it is determined that the identification information of the vehicle in which the second anti-theft management device is mounted coincides with the identification information of the stolen vehicle and when the notification information is not able to be transferred to a set theft notification destination. The second anti-theft management device transmits the identification information of the vehicle in which the second anti-theft management device is mounted to the first anti-theft management device on the basis of the transmission request.

According to a fifth aspect of the present invention, an anti-theft management method performed by an anti-theft management device is provided. The anti-theft management method includes: transmitting notification information to a vehicle located within a communicable range when the notification information is not able to be transferred to a set theft notification destination and when it is determined that identification information of a determination target vehicle coincides with identification information of a stolen vehicle on the basis of theft information including the identification information of the stolen vehicle.

According to a sixth aspect of the present invention, a program is provided causing a computer to execute a process of transmitting notification information to a vehicle located within a communicable range when the notification information is not able to be transferred to a set theft notification destination and when it is determined that identification information of a determination target vehicle coincides with identification information of a stolen vehicle on the basis of theft information including the identification information of the stolen vehicle.

Advantageous Effects of Invention

According to this invention, a device that has detected theft of a vehicle can provide a notification indicating that the vehicle has been stolen even in a case in which communication with a set theft notification destination cannot be established.

DESCRIPTION OF EMBODIMENTS

Here, while embodiments of the present invention will be described, the following embodiments do not limit the invention defined by claims. In addition, not all combinations of features described in the embodiments are essential for a means of solving the problems addressed by the invention.

First Embodiment

Figure 1:
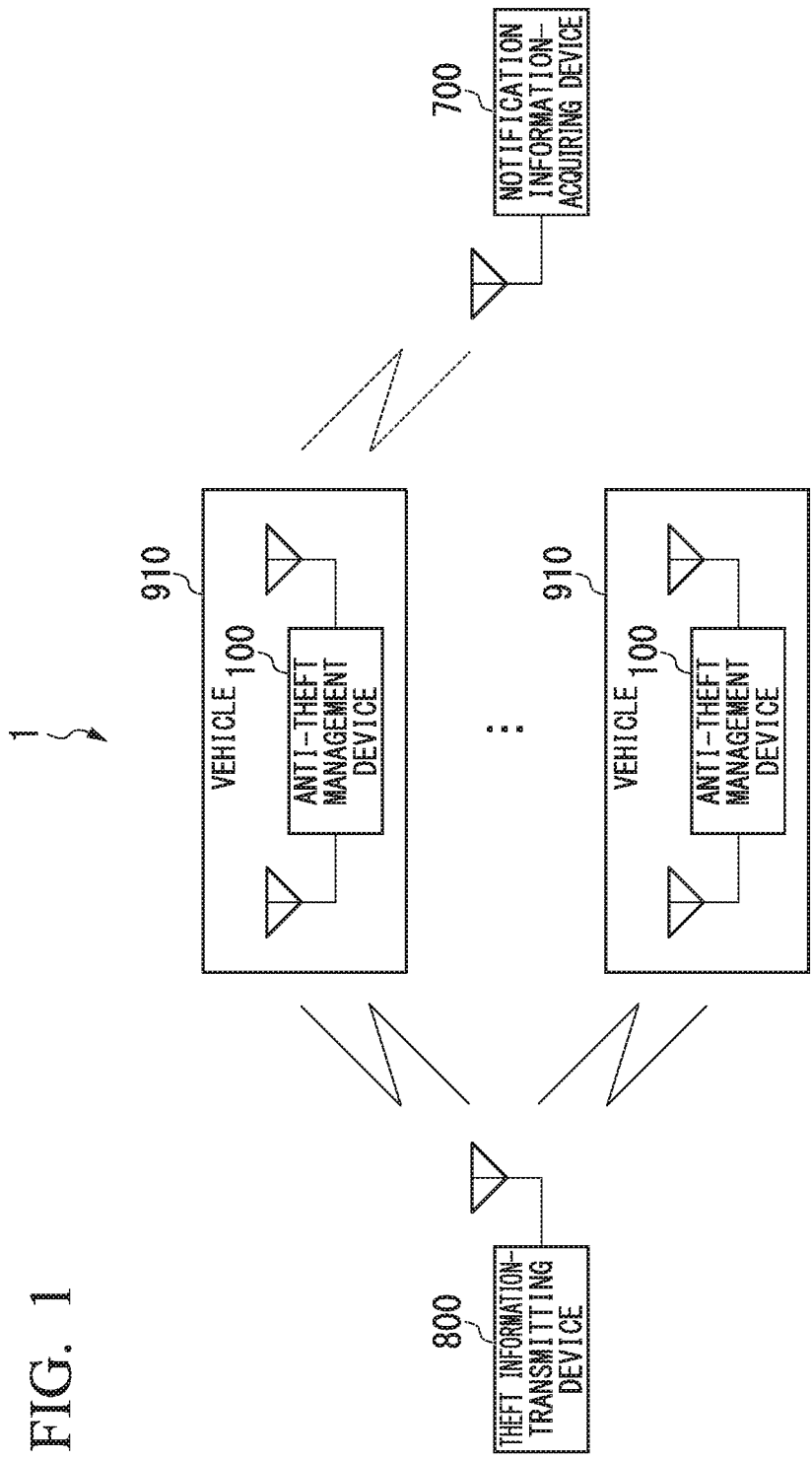
FIG. 1 is a schematic block diagram illustrating a device configuration of an anti-theft management system according to a first embodiment of the present invention.

FIG. 1 is a schematic block diagram illustrating a device configuration of an anti-theft management system according to a first embodiment of the present invention. As illustrated in FIG. 1, the anti-theft management system 1 includes an anti-theft management device 100 mounted in a vehicle 910, a theft information-transmitting device 800, and a notification information-acquiring device 700. The number of anti-theft management devices 100 included in the anti-theft management system 1 may be two or more.

The anti-theft management system 1 is a system that is used for finding a stolen vehicle in a case in which a vehicle is stolen. More specifically, the theft information-transmitting device 800 transmits theft information including at least one piece of identification information used for identifying a stolen vehicle, and the anti-theft management device 100 determines whether or not a determination target vehicle is a stolen vehicle on the basis of the theft information. In the first embodiment, the vehicle 910 in which the anti-theft management device 100 is mounted is a determination target vehicle. Thus, the anti-theft management device 100 determines whether or not identification information of its own vehicle coincides with any one piece of identification information of stolen vehicles included in the theft information, thereby determining whether or not its own vehicle is a stolen vehicle. The own vehicle described here is the vehicle 910 in which the anti-theft management device 100 is mounted.

The vehicle 910 may be any of various vehicles that are targets for theft such as an automobile, a two-wheeled vehicle, a combination thereof, and the like.

In a case in which the anti-theft management device 100 determines that its own vehicle is a stolen vehicle, the anti-theft management device 100 transmits notification information to the notification information-acquiring device 700 set in a theft notification destination. The theft notification destination is a device that accepts information of a stolen vehicle. The notification information-acquiring device 700, for example, may be installed at a public institution such as a police station or may be installed at a company that provides a service of searching for a stolen vehicle.

A method of detecting a theft notification destination that is used by the anti-theft management device 100 is not limited to a specific method. For example, information of a theft notification destination may be stored in advance by the anti-theft management device 100, or information of a theft notification destination may be included in theft information.

The notification information is used for giving a notification relating to a stolen vehicle. For example, the anti-theft management device 100 transmits the notification information including identification information used for identifying its own vehicle and location information representing a location of its own vehicle. Accordingly, the notification information-acquiring device 700 that has received the notification information can identify the location of a stolen vehicle (a vehicle in which the anti-theft management device 100 that has transmitted the notification information is mounted).

In a case in which the anti-theft management device 100 cannot establish communication with the notification information-acquiring device 700, the anti-theft management device 100 transmits the notification information to another vehicle 910 located within a communicable range of the anti-theft management device 100. As the anti-theft management device 100 mounted in another vehicle 910 relays the notification information to the notification information-acquiring device 700, the notification information-acquiring device 700 can acquire the notification information. In a case in which the anti-theft management device 100 that has received the notification information cannot establish communication with the notification information-acquiring device 700, the anti-theft management device 100 that has received the notification information transmits the notification information to an anti-theft management device 100 mounted in yet another vehicle 910.

Figure 2:
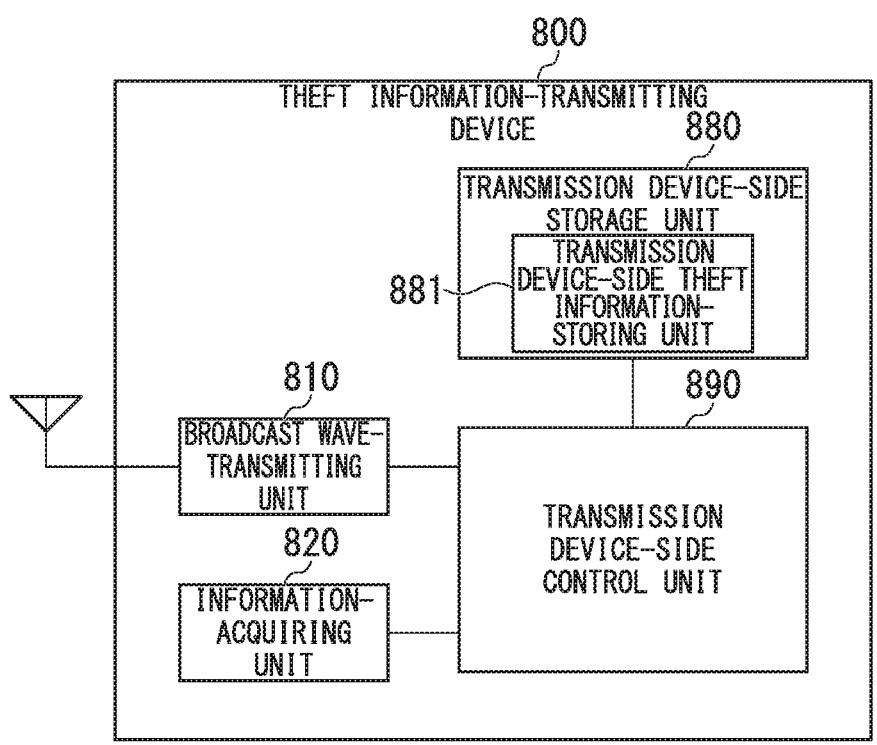
FIG. 2 is a schematic block diagram illustrating a functional configuration of a theft information-transmitting device according to the first embodiment.

FIG. 2 is a schematic block diagram illustrating a functional configuration of the theft information-transmitting device 800. As illustrated in FIG. 2, the theft information-transmitting device 800 includes a broadcast wave-transmitting unit 810, an information-acquiring unit 820, a transmitting-device-side storage unit 880 and a transmitting-device-side control unit 890. The transmitting-device-side storage unit 880 includes a transmitting-device-side theft information-storing unit 881.

The broadcast wave-transmitting unit 810 transmits theft information using broadcast waves in accordance with control of the transmitting-device-side control unit 890. In other words, the broadcast wave-transmitting unit 810 broadcasts theft information.

The information-acquiring unit 820 acquires information that is a source of the theft information. A method of acquiring information by the information-acquiring unit 820 is not limited to a specific method. For example, the information-acquiring unit 820 may include a communication device and receive identification information of a stolen vehicle from another device. Alternatively, the information-acquiring unit 820 may include an input device such as a keyboard and receive an operation of inputting identification information of a stolen vehicle.

The transmitting-device-side storage unit 880 is configured using a storage device included in the theft information-transmitting device 800 and stores various kinds of information.

The transmitting-device-side theft information-storing unit 881 stores theft information.

The transmitting-device-side control unit 890 executes various processes by controlling each unit of the theft information-transmitting device 800. Particularly, the transmitting-device-side control unit 890 generates theft information on the basis of information acquired by the information-acquiring unit 820 and stores the theft information in the transmitting-device-side theft information-storing unit 881. In addition, the transmitting-device-side control unit 890 updates the theft information stored by the transmitting-device-side theft information-storing unit 881 on the basis of the information acquired by the information-acquiring unit 820.

In addition, the transmitting-device-side control unit 890 reads the theft information from the transmitting-device-side theft information-storing unit 881 and transmits the theft information by controlling the broadcast wave-transmitting unit 810. For example, the transmitting-device-side control unit 890 causes the broadcast wave-transmitting unit 810 to regularly transmit theft information.

The transmitting-device-side control unit 890, for example, is configured by a central processing unit (CPU) of a computer included in the theft information-transmitting device 800 reading and executing a program stored in the transmitting-device-side storage unit 880.

However, the method of transmitting theft information by the theft information-transmitting device 800 is not limited to broadcasting. For example, the theft information-transmitting device 800 may be configured to transmit theft information to one or a plurality of anti-theft management devices 100 using unicast or multi-cast.

Figure 3:
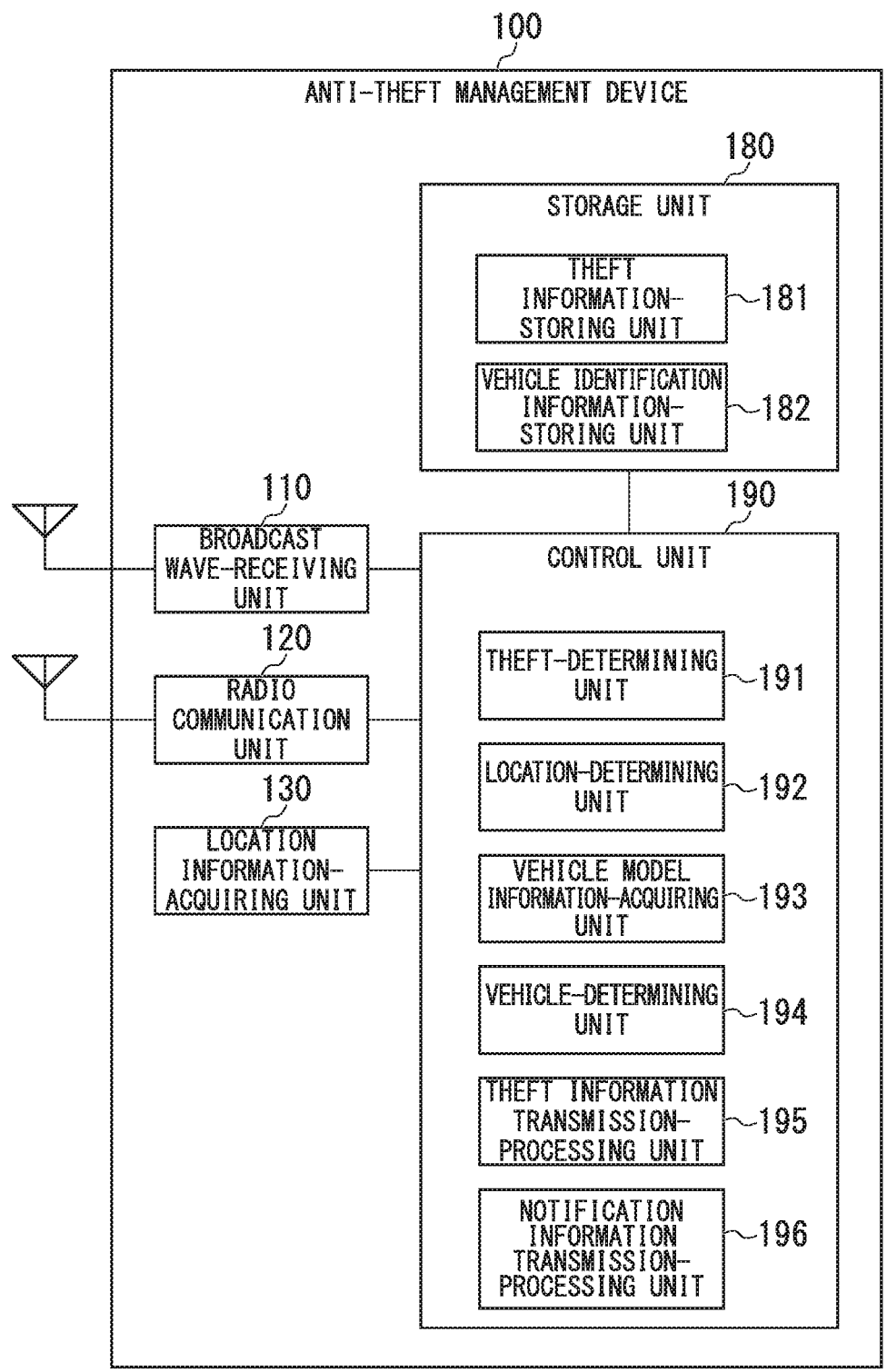
FIG. 3 is a schematic block diagram illustrating a functional configuration of an anti-theft management device according to the first embodiment.

FIG. 3 is a schematic block diagram illustrating a functional configuration of the anti-theft management device 100. As illustrated in FIG. 3, the anti-theft management device 100 includes a broadcast wave-receiving unit 110, a radio communication unit 120, a location information-acquiring unit 130, a storage unit 180 and a control unit 190.

The storage unit 180 includes a theft information-storing unit 181 and a vehicle identification information-storing unit 182. The control unit 190 includes a theft-determining unit 191, a location-determining unit 192, a vehicle model information-acquiring unit 193, a vehicle-determining unit 194, a theft information transmission-processing unit 195 and a notification information transmission-processing unit 196.

The broadcast wave-receiving unit 110 receives broadcast waves. Particularly, the broadcast wave-receiving unit 110 receives theft information transmitted by the theft information-transmitting device 800 using broadcast waves. The broadcast wave-receiving unit 110 corresponds to an example of a theft information-receiving unit.

The radio communication unit 120 communicates with other devices using unicast or multi-cast. Particularly, in a case in which it is determined that a determination target vehicle is a stolen vehicle, the radio communication unit 120 transmits notification information to the notification information-acquiring device 700 in accordance with control of the control unit 190. In the first embodiment, the own vehicle is the determination target vehicle. In a case in which the own vehicle is determined to be a stolen vehicle, the radio communication unit 120 transmits notification information to the notification information-acquiring device 700 in accordance with control of the control unit 190. As described above, the notification information is used for giving a notification relating to a stolen vehicle.

As described above, the own vehicle is a vehicle in which the anti-theft management device 100 is mounted. For example, the own vehicle of the radio communication unit 120 is the vehicle 910 in which the anti-theft management device 100 including the radio communication unit 120 is mounted.

In a case in which the radio communication unit 120 cannot establish communication with the notification information-acquiring device 700 (thus, in a case in which the radio communication unit 120 cannot transfer the notification information to the notification information-acquiring device 700), the radio communication unit 120 transmits the notification information to another vehicle 910 located within a communicable range of the radio communication unit 120 in accordance with the control of the control unit 190. In other words, the radio communication unit 120 transmits the notification information to the anti-theft management device 100 of another vehicle 910 with which the radio communication unit 120 can communicate. Another vehicle 910 described here is a vehicle other than the own vehicle.

As described above, the anti-theft management device 100 mounted in another vehicle 910 relays the notification information to the notification information-acquiring device 700, whereby the notification information-acquiring device 700 can acquire the notification information. In a case in which the anti-theft management device 100 that has received the notification information cannot establish communication with the notification information-acquiring device 700, the anti-theft management device 100 transmits the notification information to another anti-theft management device 100 mounted in yet another vehicle 910.

In a case in which the radio communication unit 120 cannot establish communication with the notification information-acquiring device 700, the anti-theft management device 100 can use any one of various methods as a method of determining the vehicle 910 of a notification information transmission destination.

For example, the radio communication unit 120 may transmit notification information to anti-theft management devices 100 of all the vehicles 910 located within a communicable range of the radio communication unit 120 using multi-cast or unicast for each.

The radio communication unit 120 may transmit notification information to anti-theft management devices 100 of vehicles of a specific vehicle model among vehicles located within the communicable range of the radio communication unit 120. For example, the radio communication unit 120 may transmit the notification information to a public vehicle such as a police vehicle or the like. The radio communication unit 120 may transmit the notification information to a vehicle of a company that provides a service of searching for a stolen vehicle.

The radio communication unit 120 can decrease the possibility of information leakage by selectively transmitting the notification information to vehicles of a specific type. For example, in a case in which contact information of an owner of the vehicle is included in the notification information, the possibility of leakage of the contact information can be decreased.

The radio communication unit 120 may transmit the notification information to a vehicle, wherein the vehicle is determined (selected) on the basis of the location of the notification information-acquiring device 700 and the advancement direction of the vehicle by the vehicle-determining unit 194 among vehicles located within the communicable range of the radio communication unit 120. For example, the vehicle-determining unit 194 may detect a vehicle present in a direction approaching the notification information-acquiring device 700 among vehicles located within the communicable range of the radio communication unit 120. The radio communication unit 120 may transmit the notification information to the detected vehicle. As the vehicle that has received the notification information approaches the notification information-acquiring device 700, a possibility of the notification information arriving at the notification information-acquiring device 700 increases.

In a case in which the own vehicle of the radio communication unit 120 is located outside a reception area of theft information transmitted from the theft information-transmitting device 800, the radio communication unit 120 transmits the theft information to another vehicle in accordance with control of the control unit 190. More specifically, in a case in which the location-determining unit 192 determines that its own vehicle is located outside the reception area of theft information transmitted from the theft information-transmitting device 800, the radio communication unit 120 transmits the theft information stored by the theft information-storing unit 181 to another vehicle.

Accordingly, another vehicle can acquire the theft information outside the reception area of the theft information transmitted from the theft information-transmitting device 800 and can determine theft.

In a case in which there are a plurality of theft information-transmitting devices 800, and different theft information is transmitted for each theft information-transmitting device 800, the radio communication unit 120 may transmit the theft information received from a theft information-transmitting device 800 of a moving source of its own vehicle to another vehicle also in a communication range of another theft information-transmitting device 800 of a moving destination.

Accordingly, another vehicle can acquire more theft information, and therefore a possibility of a stolen vehicle being found increases.

The radio communication unit 120 transmits notification information transmitted from another vehicle.

More specifically, the radio communication unit 120 corresponds to an example of a notification information-receiving unit and receives notification information transmitted from another vehicle. The radio communication unit 120 transmits (transfers) the received notification information to the notification information-acquiring device 700 in accordance with control of the control unit 190.

In a case in which the radio communication unit 120 cannot transfer the received notification information to the notification information-acquiring device 700, the radio communication unit 120, similar to notification information in the case in which its own vehicle is a stolen vehicle, transmits (transfers) the notification information to another vehicle located within the communicable range of the radio communication unit 120.

By the anti-theft management device 100 transmits the notification information in this way, a possibility of the notification information-acquiring device 700 acquiring the notification information can be increased.

The location information-acquiring unit 130 acquires location information of its own vehicle (a vehicle in which the anti-theft management device 100 including the location information-acquiring unit 130 is mounted). For example, the location information-acquiring unit 130 includes a global navigation satellite system (GNSS) and performs positioning.

The storage unit 180 is configured using a storage device included in the anti-theft management device 100 and stores various kinds of information.

The theft information-storing unit 181 stores theft information. In the first embodiment, the theft information-storing unit 181 stores the theft information received from the theft information-transmitting device 800 by the broadcast wave-receiving unit 110.

The vehicle identification information-storing unit 182 stores identification information of its own vehicle (a vehicle in which the anti-theft management device 100 including the vehicle identification information-storing unit 182 is mounted). The identification information of a vehicle is used for uniquely identifying the vehicle but is not limited to specific information. For example, as the identification information of a vehicle, a vehicle number (a number represented on a registration number plate) may be used, but the identification information is not limited thereto.

In the first embodiment, the own vehicle is a determination target vehicle for which it is to be determined whether or not the own vehicle is a stolen vehicle, and the identification information stored by the vehicle identification information-storing unit 182 corresponds to an example of identification information of the determination target vehicle.

The control unit 190 executes various processes by controlling each unit of the anti-theft management device 100. The control unit 190, for example, is realized by a CPU of a computer included in the anti-theft management device 100 reading a program from the storage unit 180 and executing the program.

The theft-determining unit 191 determines whether or not a determination target vehicle is a stolen vehicle by determining whether or not the identification information of the determination target vehicle and identification information of a stolen vehicle included in the theft information coincide with each other. In a case in which a plurality of pieces of identification information of stolen vehicles are included in the theft information, the theft-determining unit 191 determines that the determination target vehicle is a stolen vehicle in a case in which the identification information of the determination target vehicle coincides with any one of the pieces of the identification information of the stolen vehicles included in the theft information.

In the first embodiment, the own vehicle (a vehicle 910 in which the anti-theft management device 100 including the theft-determining unit 191 is mounted) is a determination target vehicle, and the theft-determining unit 191 determines whether or not the identification information of the own vehicle coincides with the identification information of a stolen vehicle.

The location-determining unit 192 determines whether or not its own vehicle (a vehicle 910 in which an anti-theft management device 100 including the location-determining unit 192 is mounted) is located within the reception area of theft information. For example, the storage unit 180 stores the reception area of theft information, and the location-determining unit 192 determines whether or not a location of its own vehicle is within the reception area of theft information on the basis of location information acquired by the location information-acquiring unit 130. Alternatively, the broadcast wave-receiving unit 110 may determine whether or not theft information can be extracted from a reception signal, and the location-determining unit 192 may determine whether or not its own vehicle is located within the reception area of theft information on the basis of a result of the determination.

The result of the determination executed by the location-determining unit 192 is used for controlling the process of the radio communication unit 120 transmitting theft information to another vehicle described above.

The vehicle model information-acquiring unit 193 acquires vehicle model information that represents a notification information transmission target vehicle model. The notification information transmission target model indicates a vehicle model or a model of a vehicle that is a transmission destination of notification information. This vehicle model information represents the specific model described above. In a case in which the radio communication unit 120 cannot transfer notification information to a set theft notification destination (in the first embodiment, the notification information-acquiring device 700), the radio communication unit 120 transmits the notification information to vehicles of a vehicle model represented in the vehicle model information acquired by the vehicle model information-acquiring unit 193.

As a method of acquiring vehicle model information used by the vehicle model information-acquiring unit 193, any one of various methods can be used. For example, the storage unit 180 may store vehicle model information in advance, and the vehicle model information-acquiring unit 193 may read the vehicle model information from the storage unit 180. Alternatively, vehicle model information may be included in the theft information, and the vehicle model information-acquiring unit 193 may read the vehicle model information from the theft information.

The vehicle-determining unit 194 determines a vehicle having a relatively high possibility of being close to the theft notification destination as a notification information transmission target vehicle on the basis of the location of the set theft notification destination and the location of its own vehicle (a vehicle 910 in which an anti-theft management device 100 including the vehicle-determining unit 194 is mounted). For example, the vehicle-determining unit 194 determines whether or not another vehicle approaches the theft information-transmitting device 800 on the basis of the location of its own vehicle, the location of the theft information-transmitting device 800 and the direction of the other vehicle (the running direction). The vehicle-determining unit 194 determines the vehicle determined to have approached the theft information-transmitting device 800 as a notification information transmission target vehicle. The vehicle-determining unit 194 may determine one vehicle as a notification information transmission target vehicle or may determine a plurality of vehicles as notification information transmission target vehicles. As described above, in a case in which the radio communication unit 120 cannot transfer notification information to the theft information-transmitting device 800, the radio communication unit 120 transmits the notification information to the vehicle determined by the vehicle-determining unit 194.

The theft information transmission-processing unit 195 performs the process of transmitting theft information to another vehicle described above.

More specifically, in a case in which the location-determining unit 192 determines that its own vehicle (a vehicle 910 in which an anti-theft management device 100 including the theft information transmission-processing unit 195 is mounted) is located outside the reception area of the theft information, the theft information transmission-processing unit 195 reads the theft information from the theft information-storing unit 181, controls the radio communication unit 120 and causes it to transmit the theft information to another vehicle.

In a case in which there are a plurality of theft information-transmitting devices 800, and theft information different for each theft information-transmitting device 800 is transmitted, the theft information transmission-processing unit 195 may transmit theft information received from a theft information-transmitting device 800 of a moving source of its own vehicle to another vehicle within the communication range of another theft information-transmitting device 800 of a moving destination by controlling the radio communication unit 120.

The notification information transmission-processing unit 196 performs a process of transferring the notification information transmitted by another vehicle. More specifically, when the radio communication unit 120 receives notification information from another vehicle, the notification information transmission-processing unit 196 stores the notification information in the storage unit 180. The notification information transmission-processing unit 196 attempts to establish communication with the notification information-acquiring device 700 by controlling the radio communication unit 120. In a case in which the notification information transmission-processing unit 196 succeeds in establishing communication with the notification information-acquiring device 700, the notification information transmission-processing unit 196 transmits (transfers) notification information to the notification information-acquiring device 700 by controlling the radio communication unit 120.

On the other hand, in a case in which the notification information transmission-processing unit 196 fails to establish communication with the notification information-acquiring device 700, the notification information transmission-processing unit 196 transmits (transfers) the notification information to another vehicle by controlling the radio communication unit 120. In this case, as a method of selecting another vehicle, a method similar to the method of selecting a vehicle that is a notification information transmission target in a case in which its own vehicle is a stolen vehicle, and notification information cannot be transferred to a set theft notification destination may be used.

The method of acquiring identification information of the determination target vehicle that is used by the anti-theft management device 100 is not limited to the method of storing the identification information using the vehicle identification information-storing unit 182. For example, the anti-theft management device 100 may include a camera, capture other vehicles, and read identification information (for example, a vehicle number) from the captured image of the captured vehicles. In such a case, the theft-determining unit 191 determines whether or not the identification information of a vehicle captured by the camera coincides with the identification information of a stolen vehicle included in the notification information. In a case in which the theft-determining unit 191 determines that the identification information acquired from the image coincides with the identification information of the stolen vehicle, the radio communication unit 120 transmits notification information representing that the vehicle captured by the camera is the stolen vehicle to the notification information-acquiring device 700 in accordance with control of the control unit 190. In a case in which the radio communication unit 120 cannot transfer the notification information to the notification information-acquiring device 700, the radio communication unit 120 transmits the notification information to a vehicle located within the communicable range of the radio communication unit 120 in accordance with control of the control unit 190.

Next, the operation of the anti-theft management system 1 will be described with reference to FIGS. 4 and 5.

Figure 4:
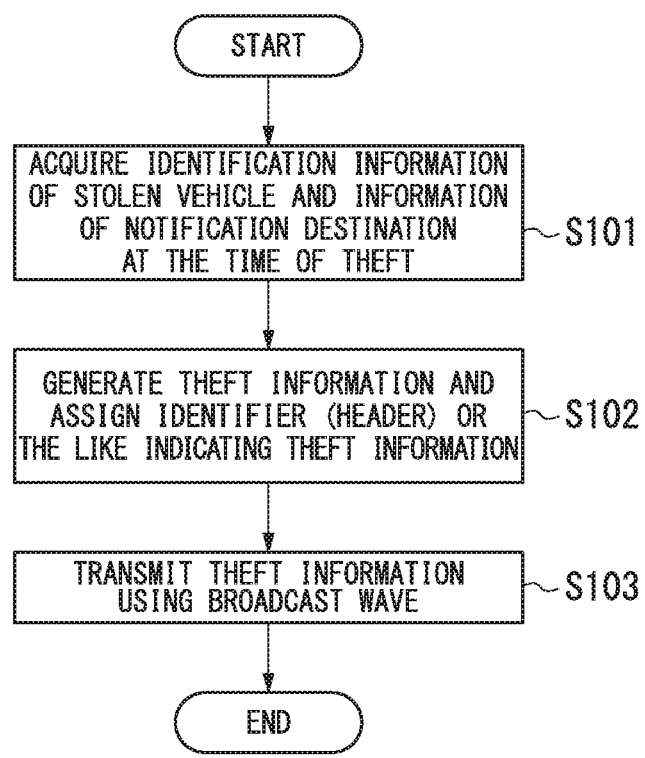
FIG. 4 is a flowchart illustrating an example of a sequence of a process of transmitting theft information by a theft information-transmitting device according to the first embodiment.

FIG. 4 is a flowchart illustrating an example of a sequence of a process of transmitting theft information by the theft information-transmitting device 800. The theft information-transmitting device 800, for example, executes the process illustrated in FIG. 4 for every predetermined period.

In the process illustrated in FIG. 4, the transmitting-device-side control unit 890 acquires identification information of a stolen vehicle and information of a notification destination at the time of a theft (theft notification destination) (Step S101). More specifically, the transmitting-device-side control unit 890 reads theft information from the transmitting-device-side theft information-storing unit 881. In addition, the transmitting-device-side control unit 890 reads information of a theft notification destination from the transmitting-device-side storage unit 880.

In a case in which the anti-theft management device 100 acquires the information of a theft notification destination using a method other than a method of reading information of a theft notification destination from theft information such as a case in which the storage unit 180 stores the information of a theft notification destination in advance or the like, the transmitting-device-side control unit 890 may not read the information of a theft notification destination in Step S101.

The transmitting-device-side control unit 890 generates theft information using the information acquired in Step S101 and assigns a header and the like including an identifier representing theft information and the like to the theft information (Step S102).

The broadcast wave-transmitting unit 810 transmits the theft information to which the header and the like have been assigned in Step S102 using broadcast waves in accordance with control of the transmitting-device-side control unit 890 (Step S103).

After Step S103, the process illustrated in FIG. 4 ends.

Figure 5:
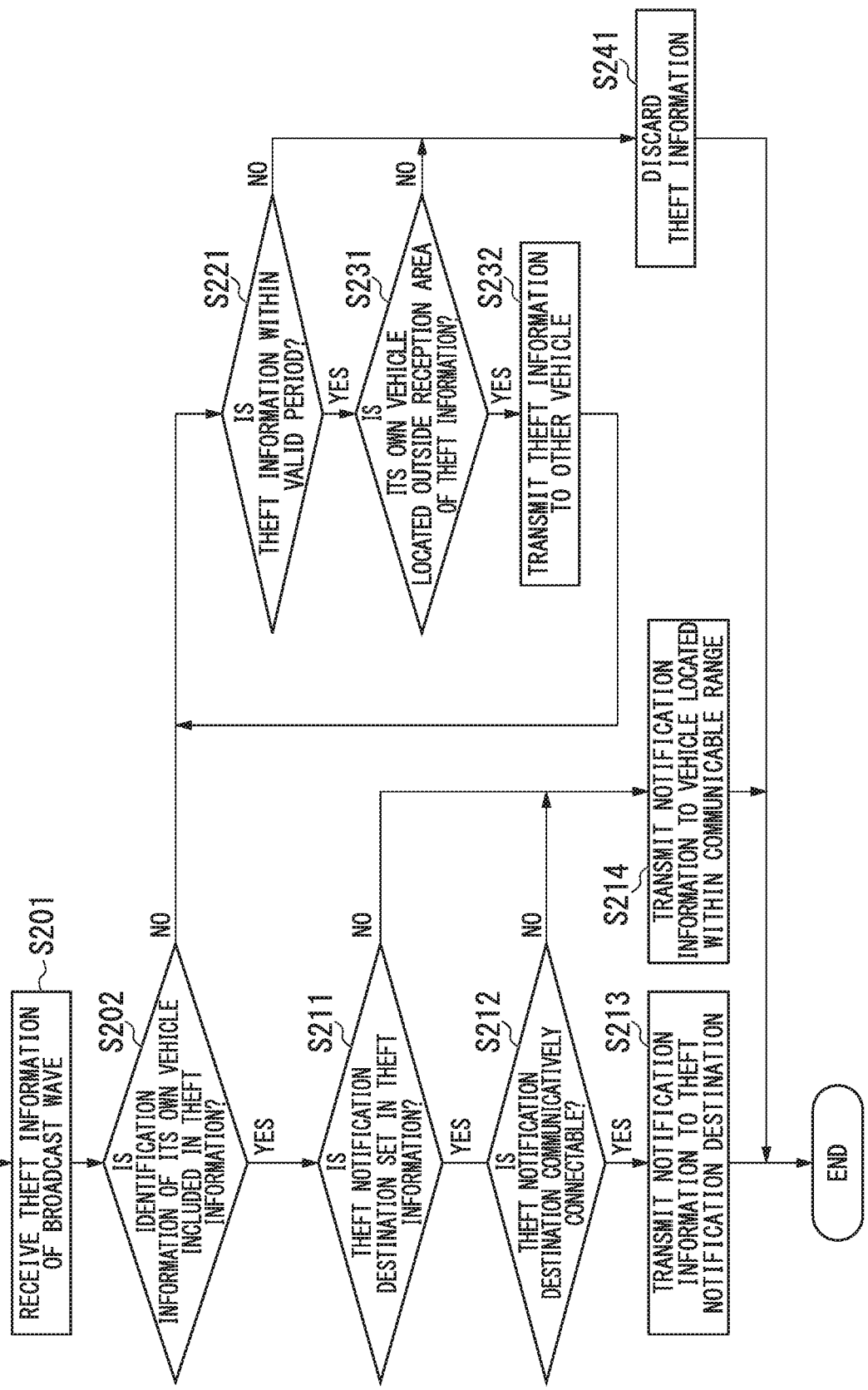
FIG. 5 is a flowchart illustrating an example of the sequence of a process executed by the anti-theft management device according to the first embodiment.

FIG. 5 is a flowchart illustrating an example of the sequence of a process executed by the anti-theft management device 100. The anti-theft management device 100, for example, executes the process illustrated in FIG. 5 for every predetermined period.

In the process illustrated in FIG. 5, the broadcast wave-receiving unit 110 receives theft information using broadcast waves (Step S201). More specifically, the control unit 190 waits for the broadcast wave-receiving unit 110 to receive theft information.

The theft-determining unit 191 determines whether or not identification information of its own vehicle is included in the theft information (Step S202). More specifically, the theft-determining unit 191 reads the identification information of its own vehicle from the vehicle identification information-storing unit 182. The theft-determining unit 191 determines whether or not the read identification information of its own vehicle coincides with identification information of a stolen vehicle included in the theft information. In this way, the theft-determining unit 191 determines whether or not its own vehicle is the stolen vehicle.

In a case in which the theft-determining unit 191 determines that the identification information of its own vehicle is included in the theft information (Step S202: Yes), the theft-determining unit 191 determines whether or not a theft notification destination is set in the theft information (Step S211). However, the method of acquiring information of a theft notification destination by the anti-theft management device 100 is not limited to the method of reading the information from the theft information. For example, in a case in which the storage unit 180 stores the information of a theft notification destination, the theft-determining unit 191 determines whether or not the storage unit 180 stores the information of a theft notification destination.

In a case in which the theft-determining unit 191 determines that a theft notification destination is set in the theft information (Step S211: Yes), the theft-determining unit 191 determines whether or not the radio communication unit 120 can be communicatively connected to the theft notification destination (Step S212). In the first embodiment, the notification information-acquiring device 700 is the theft notification destination, the theft-determining unit 191 determines whether or not the radio communication unit 120 can be communicatively connected to the notification information-acquiring device 700.

In a case in which the theft-determining unit 191 determines that the radio communication unit 120 can be communicatively connected to the theft notification destination (Step S212: Yes), the radio communication unit 120 transmits notification information to the theft notification destination (the notification information-acquiring device 700 in the first embodiment) in accordance with control of the control unit 190 (Step S213).

After Step S213, the anti-theft management device 100 ends the process illustrated in FIG. 5.

In a case in which the theft-determining unit 191 determines that the radio communication unit 120 cannot be communicatively connected to the theft notification destination in Step S212 (Step S212: No), the radio communication unit 120 transmits notification information to a vehicle located within the communication range of the radio communication unit 120 in accordance with control of the control unit 190 (Step S214).

As described above, as the method of selecting a vehicle that is a transmission destination of the notification information by the anti-theft management device 100 in this case, one of various methods may be used.

After Step S214, the anti-theft management device 100 ends the process illustrated in FIG. 5.

In a case in which the theft-determining unit 191 determines that a theft notification destination is set in the theft information in Step S211 (Step S211: Yes), the theft-determining unit 191 causes the process to proceed to Step S214.

In a case in which the theft-determining unit 191 determines that information of its own vehicle is not included in the theft information in Step S202 (Step S202: No), the theft information transmission-processing unit 195 determines whether or not the theft information stored by the theft information-storing unit 181 is within a valid period (Step S221). For example, valid period information is included in the theft information, and the theft information transmission-processing unit 195 compares a valid period represented in the valid period information with the current date and time.

In a case in which the theft information transmission-processing unit 195 determines that the theft information is valid (Step S221: Yes), the location-determining unit 192 determines whether or not its own vehicle is located outside the reception area of the theft information (Step S231).

In a case in which the location-determining unit 192 determines that its own vehicle is located outside the reception area of the theft information (Step S231: Yes), the radio communication unit 120 transmits (transfers) the theft information to another vehicle in accordance with control of the theft information transmission-processing unit 195 (Step S232). At that time, the storage unit 180 stores a time when the theft information is previously transmitted, and, in a case in which a predetermined time or more elapses from the previous transmission, the theft information transmission-processing unit 195 may transmit the theft information by controlling the radio communication unit 120. In this way, the radio communication unit 120 regularly transmits theft information to other vehicles.

After Step S232, the control unit 190 causes the process to return to Step S221.

In a case in which the location-determining unit 192 determines that its own vehicle is located within the reception area of a theft location in Step S231 (Step S231: No), the control unit 190 discards the theft information stored by the theft information-storing unit 181 (Step S241). In other words, the control unit 190 deletes the theft information stored by the theft information-storing unit 181. In this case, the reason for this is that new theft information is expected to be received by the broadcast wave-receiving unit 110.

After Step S241, the anti-theft management device 100 ends the process illustrated in FIG. 5.

In a case in which the theft information transmission-processing unit 195 determines that the theft information has passed the valid period in Step S221 (Step S221: No), the control unit 190 causes the process to proceed to Step S241.

In other words, also in this case, the control unit 190 discards the theft information stored in the storage unit 180.

As described above, in a case in which it is determined that the identification information of the determination target vehicle (its own vehicle) coincides with the identification information of a stolen vehicle on the basis of the theft information including the identification information of the stolen vehicle, and the radio communication unit 120 cannot transfer notification information to the notification information-acquiring device 700, the radio communication unit 120 transmits the notification information to a vehicle 910 located within the communicable range.

In this way, even in a case in which the radio communication unit 120 cannot establish communication with the notification information-acquiring device 700, the anti-theft management device 100 can notify that the vehicle has been stolen. Particularly, as the anti-theft management device 100 mounted in another vehicle that has received notification information transmits the notification information to the notification information-acquiring device 700, even in a case in which the anti-theft management device 100 that has detected a theft of a vehicle cannot establish communication with the notification information-acquiring device 700, the anti-theft management device 100 can notify of a theft of the vehicle.

The broadcast wave-receiving unit 110 receives the theft information. In addition, the theft-determining unit 191 determines whether or not the identification information of its own vehicle that is a determination target vehicle coincides with the identification information of the stolen vehicle. In a case in which the theft-determining unit 191 determines that the identification information of its own vehicle coincides with the identification information of the stolen vehicle, and the radio communication unit 120 cannot transfer the notification information to the notification information-acquiring device 700, the radio communication unit 120 transmit the notification information to a vehicle 910 located within the communicable range.

In this way, even in a case in which the anti-theft management device 100 cannot establish communication with the notification information-acquiring device 700, the anti-theft management device 100 can notify that the vehicle has been stolen. Particularly, as the anti-theft management device 100 mounted in another vehicle that has received the notification information transmits the notification information to the notification information-acquiring device 700, even in a case in which the anti-theft management device 100 that has detected a theft of the vehicle cannot establish communication with the notification information-acquiring device 700, the anti-theft management device 100 can notify that the vehicle has been stolen.

The theft information-storing unit 181 stores the theft information received by the broadcast wave-receiving unit 110. The location-determining unit 192 determines whether or not its own vehicle is located within the reception area of theft information. In a case in which the location-determining unit 192 determines that its own vehicle is located outside the reception area of theft information, the radio communication unit 120 transmits the theft information stored in the theft information-storing unit 181 to another vehicle.

In this way, the anti-theft management device 100 of another vehicle can acquire the theft information outside the reception area of the theft information from the theft information-transmitting device 800 and can perform determination of a theft (determination on whether or not the determination target vehicle is a stolen vehicle).

The broadcast wave-receiving unit 110 receives theft information using broadcast waves. In other words, the broadcast wave-receiving unit 110 receives theft information that has been broadcasted.

In this way, the theft information-transmitting device 800 does not need to individually transmit theft information to each anti-theft management device 100, and each anti-theft management device 100 can acquire the theft information.

The vehicle model information-acquiring unit 193 acquires vehicle model information representing a notification information transmission target vehicle model used in a case in which the radio communication unit 120 cannot transfer notification information to the notification information-acquiring device 700. In a case in which the radio communication unit 120 cannot transfer notification information to the notification information-acquiring device 700, the radio communication unit 120 transmits the notification information to vehicles of the vehicle model represented in the vehicle model information.

In this way, the radio communication unit 120 can selectively transmit the notification information to vehicles of a specific type and can decrease the possibility of information leakage. For example, in a case in which contact information of an owner of a vehicle is included in the notification information, the possibility of leakage of the contact information can be decreased.

The vehicle-determining unit 194 determines a notification information transmission target vehicle on the basis of the location of the notification information-acquiring device 700 and the location of its own vehicle. In a case in which the radio communication unit 120 cannot transfer the notification information to the notification information-acquiring device 700, the radio communication unit 120 transmits the notification information to the vehicle determined by the vehicle-determining unit 194.

In this way, the possibility that the notification information-acquiring device 700 acquires the notification information can be increased.

The theft-determining unit 191 determines whether or not the identification information of a vehicle captured by the camera coincides with the identification information of a stolen vehicle included in the notification information. In a case in which the theft-determining unit 191 determines that the identification information of the vehicle captured by the camera coincides with the identification information of the stolen vehicle, and the radio communication unit 120 cannot transfer the notification information to the notification information-acquiring device 700, the radio communication unit 120 transmits the notification information representing that the vehicle captured by the camera is a stolen vehicle to other vehicles located within the communicable range.

In this way, even in a case in which the theft-determining unit 191 detects that the vehicle captured by the camera is a stolen vehicle, and the radio communication unit 120 cannot establish communication with the notification information-acquiring device 700, the anti-theft management device 100 can notify that the vehicle captured by the camera is a stolen vehicle.

The radio communication unit 120 receives the notification information transmitted from another vehicle. In a case in which the radio communication unit 120 cannot transfer the notification information to the notification information-acquiring device 700, the radio communication unit 120 transmit the notification information to vehicles located within the communicable range.

In this way, the radio communication unit 120 transmits the notification information received from another vehicle, whereby the possibility that the notification information-acquiring device 700 acquires the notification information can be increased.

Second Embodiment

In a case in which there is no need to include a structure used by the anti-theft management device to receive broadcast waves from the theft information-transmitting device 800, the configuration of an anti-theft management device can be simplified, and the manufacturing cost of the anti-theft management device can be decreased. Thus, in a second embodiment, a first anti-theft management device receives theft information using broadcast waves from a theft information-transmitting device 800 and transmits the theft information to a second anti-theft management device using unicast or multi-cast. Accordingly, the second anti-theft management device can acquire the theft information without including a structure for receiving broadcast waves transmitted from the theft information-transmitting device 800. From this viewpoint, the configuration of the second anti-theft management device can be simplified, and the manufacturing cost of the second anti-theft management device can be decreased.

Figure 6:
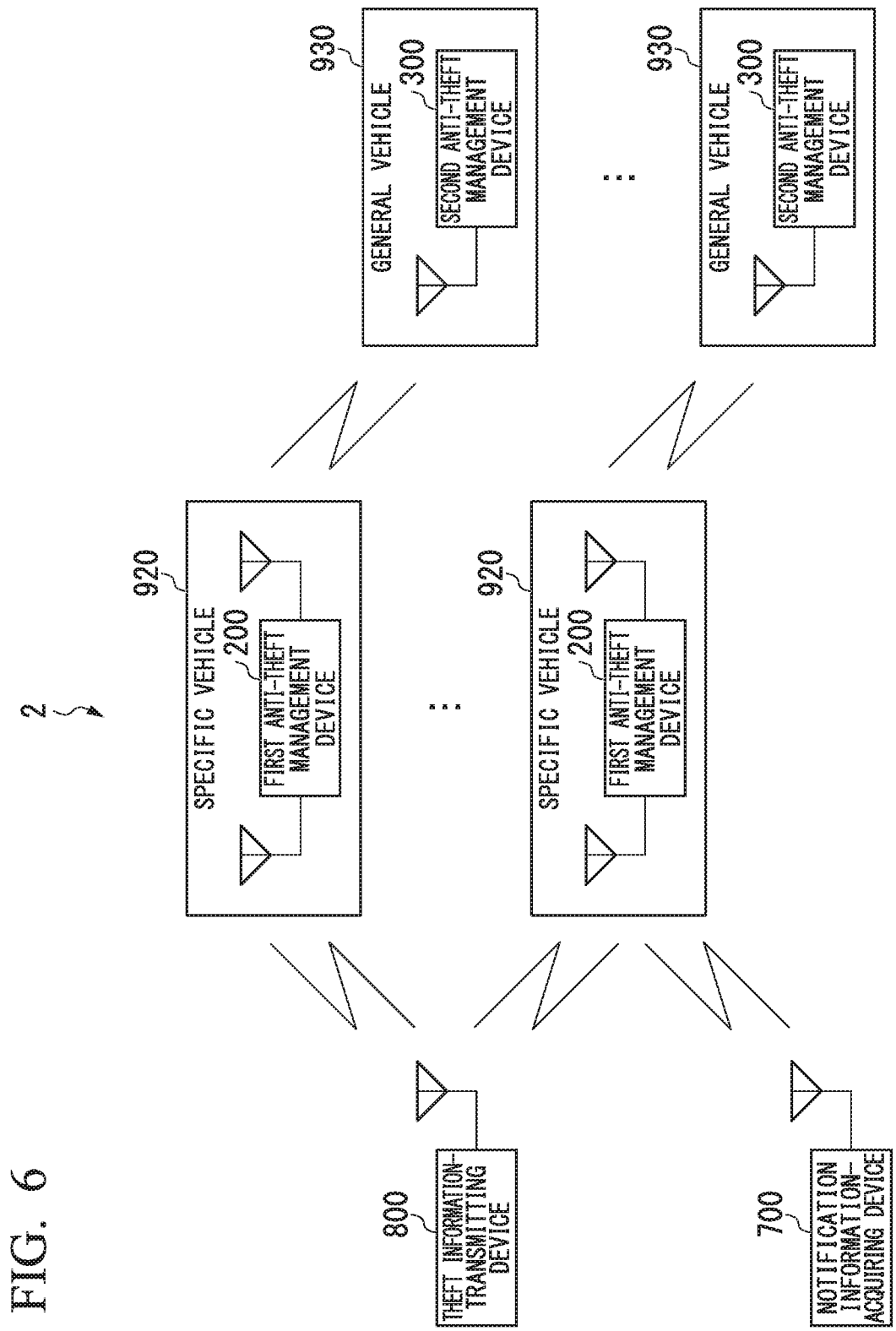
FIG. 6 is a schematic block diagram illustrating a device configuration of an anti-theft management system according to a second embodiment of the present invention.

FIG. 6 is a schematic block diagram illustrating the device configuration of an anti-theft management system according to the second embodiment of the present invention. As illustrated in FIG. 6, the anti-theft management system 2 includes a first anti-theft management device 200 mounted in a specific vehicle 920, a second anti-theft management device 300 mounted in a general vehicle 930, a theft information-transmitting device 800 and a notification information-acquiring device 700.

The same reference sign (800) will be assigned to a part having a similar configuration in correspondence with each unit illustrated in FIG. 1 among the units illustrated in FIG. 6, and description thereof will be omitted.

Each of the number of first anti-theft management devices 200 and the number of second anti-theft management devices 300 included in the anti-theft management system 2 may be two or more. In addition, the number of first anti-theft management devices 200 and the number of second anti-theft management devices 300 may be different from each other.

The first anti-theft management device 200 corresponds to an example of a relay device, receives theft information from the theft information-transmitting device 800 and transmits the theft information to the second anti-theft management device 300.

In the second embodiment, the first anti-theft management device 200 functions as a theft notification destination of the second anti-theft management device 300. The first anti-theft management device 200 receives notification information from the second anti-theft management device 300 and transmits (transfers) the received notification information to the notification information-acquiring device 700. However, a theft notification destination of the second anti-theft management device 300 is not limited to the first anti-theft management device 200. For example, a theft notification destination of the second anti-theft management device 300 may be set as the notification information-acquiring device 700.

A vehicle in which the first anti-theft management device 200 is mounted will be referred to as a specific vehicle 920. The specific vehicle 920, for example, similar to a vehicle of a specific vehicle model described in the first embodiment, may be either a public vehicle such as a police vehicle or a vehicle of a company that provides a service of searching for a stolen vehicle. However, all the vehicles of such a vehicle model do not need to have the first anti-theft management device 200 mounted therein. In other words, only some of vehicles of such a vehicle model may be specific vehicles 920.

The second anti-theft management device 300 corresponds to an example of an anti-theft management device and, similar to the anti-theft management device 100 according to the first embodiment, detects a stolen vehicle and transmits notification information.

A vehicle in which the second anti-theft management device 300 is mounted will be referred to as a general vehicle 930. The general vehicle 930, for example, is a vehicle of a vehicle model other than the vehicle model of the specific vehicle 920. However, all the vehicles of vehicle models other than the vehicle model of the specific vehicle 920 do not need to have the second anti-theft management device 300 mounted therein. In other words, only some of the vehicles of vehicle models other than the vehicle model of the specific vehicle 920 may be general vehicles 930.

Figure 7:
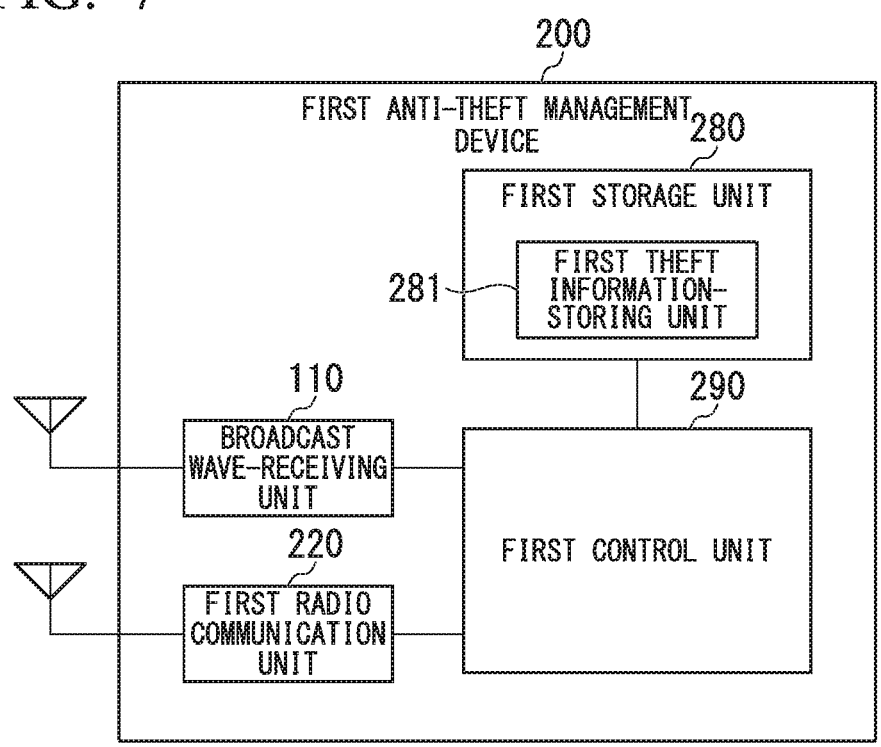
FIG. 7 is a schematic block diagram illustrating a functional configuration of a first anti-theft management device according to the second embodiment.

FIG. 7 is a schematic block diagram illustrating a functional configuration of the first anti-theft management device 200. As illustrated in FIG. 7, the first anti-theft management device 200 includes a broadcast wave-receiving unit 110, a first radio communication unit 220, a first storage unit 280 and a first control unit 290. The first storage unit 280 includes a first theft information-storing unit 281.

The same reference sign (110) will be assigned to a part having a similar function in correspondence with each unit illustrated in FIG. 3 among the units illustrated in FIG. 7, and description thereof will be omitted.

The first radio communication unit 220 performs communication with a second radio communication unit 320 of the second anti-theft management device 300 using uni-cast or multicast. Particularly, the first radio communication unit 220 transmits (transfers) theft information received from the theft information-transmitting device 800 to the second radio communication unit 320 in accordance with control of the first control unit 290. In addition, the first radio communication unit 220 receives notification information transmitted by the second radio communication unit 320 and transmits (transfers) the received notification information to the notification information-acquiring device 700 in accordance with control of the first control unit 290.

The first storage unit 280 is configured using a storage device included in the first anti-theft management device 200 and stores various kinds of information.

The first theft information-storing unit 281 stores theft information, which has been transmitted from theft information-transmitting device 800 and has been received by the broadcast wave-receiving unit 110, in accordance with control of the first control unit 290.

The first control unit 290 executes various processes by controlling each unit of the first anti-theft management device 200.

Particularly, the first control unit 290 performs a process of transmitting theft information received from the theft information-transmitting device 800 to the second anti-theft management device 300. More specifically, when the broadcast wave-receiving unit 110 receives theft information from the theft information-transmitting device 800, the first control unit 290 stores the theft information received by the broadcast wave-receiving unit 110 in the theft information-storing unit 181. The first control unit 290 transmits (transfers) the theft information stored in the first theft information-storing unit 281 to the second anti-theft management device 300 by controlling the first radio communication unit 220.

The first control unit 290 performs the process of transmitting the notification information received from the second anti-theft management device 300 to the notification information-acquiring device 700. More specifically, when the first radio communication unit 220 receives the notification information from the second anti-theft management device 300, the first control unit 290 stores the notification information received by the first radio communication unit 220 in the first storage unit 280. The first control unit 290 transmits (transfers) the notification information stored in the first storage unit 280 to the notification information-acquiring device 700 by controlling the first radio communication unit 220.

The first control unit 290, for example, is configured by a CPU of a computer included in the first anti-theft management device 200 reading and executing a program stored in the first storage unit 280.

Figure 8:
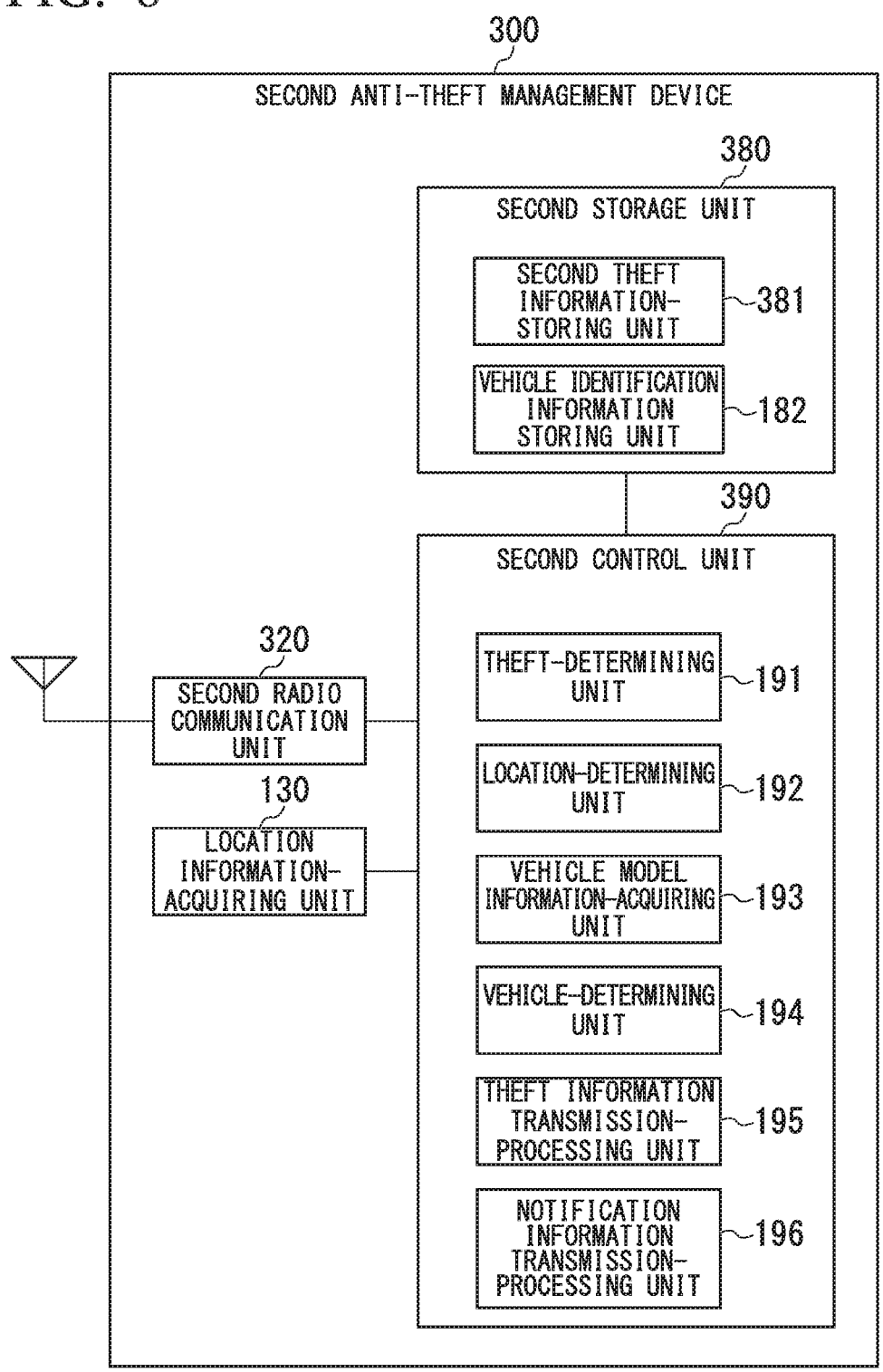
FIG. 8 is a schematic block diagram illustrating a functional configuration of a second anti-theft management device according to the second embodiment.

FIG. 8 is a schematic block diagram illustrating the functional configuration of the second anti-theft management device 300. As illustrated in FIG. 8, the second anti-theft management device 300 includes a second radio communication unit 320, a location information-acquiring unit 130, a second storage unit 380 and a second control unit 390. The second storage unit 380 includes a second theft information-storing unit 381 and a vehicle identification information-storing unit 182. The second control unit 390 includes a theft-determining unit 191, a location-determining unit 192, a vehicle model information-acquiring unit 193, a vehicle-determining unit 194, a theft information transmission-processing unit 195 and a notification information transmission-processing unit 196.

The same reference sign (130, 182, 191, 192, 193, 194, 195, and 196) will be assigned to a part having a similar function in correspondence with each unit illustrated in FIG. 3 among the units illustrated in FIG. 8, and description thereof will be omitted.

In the second anti-theft management device 300, the second radio communication unit 320 receives theft information from the first anti-theft management device 200, and a theft notification destination is the first anti-theft management device 200, which are different from the operation of the anti-theft management device 100 according to the first embodiment. The other operations of the second anti-theft management device 300 are similar to the operations of the anti-theft management device 100. The second radio communication unit 320, the second storage unit 380, the second theft information-storing unit 381 and the second control unit 390 of the second anti-theft management device 300 illustrated in FIG. 8 respectively correspond to the radio communication unit 120, the storage unit 180, the theft information-storing unit 181 and the control unit 190 of the anti-theft management device 100 illustrated in FIG. 3.

As described above, a theft notification destination of the second anti-theft management device 300 is not limited to the first anti-theft management device 200.

The operations of the first anti-theft management device 200 and the second anti-theft management device 300 will be described with reference to FIG. 9.

Figure 9:
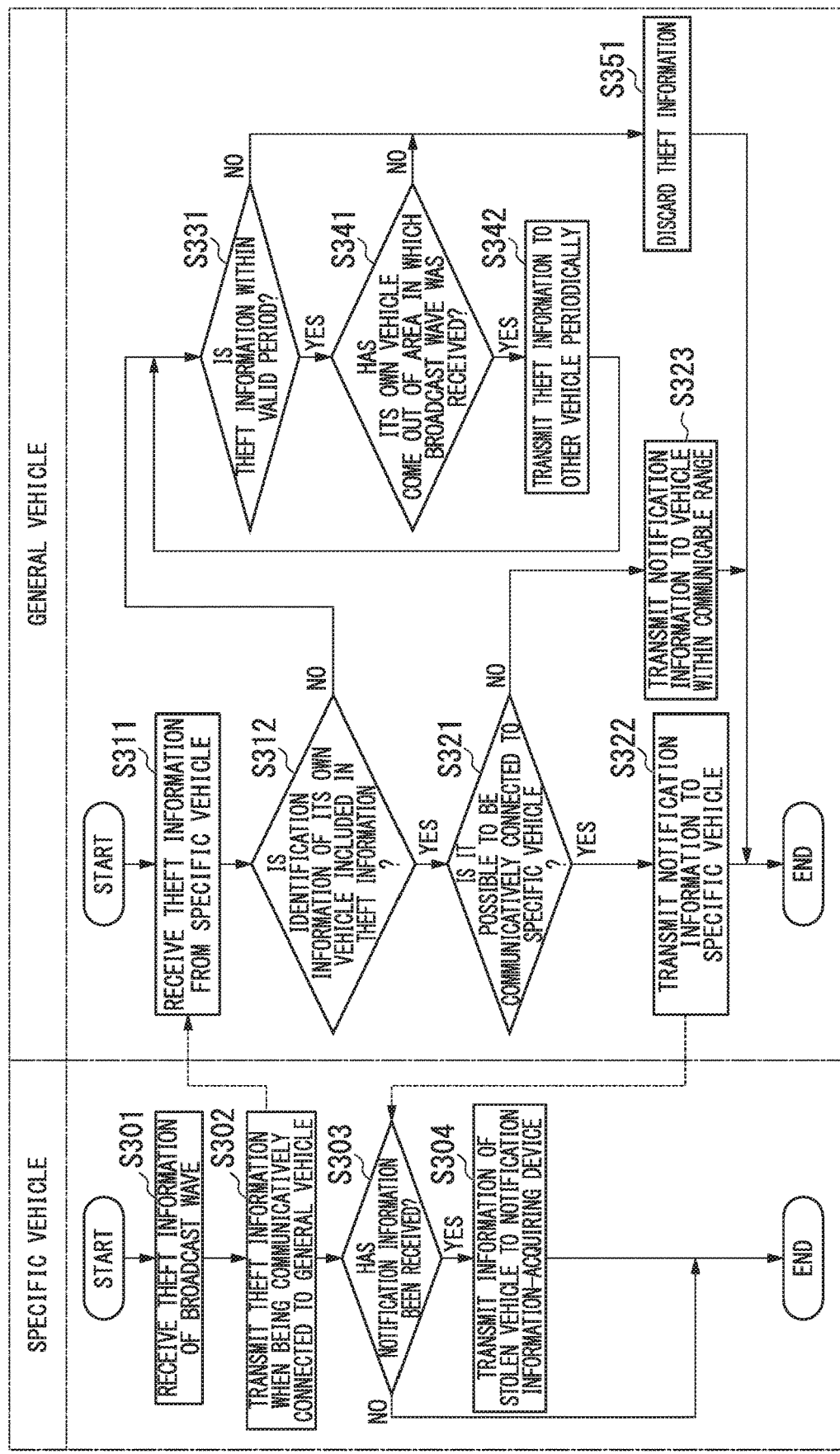
FIG. 9 is a flowchart illustrating an example of a sequence of a process executed by each of the first anti-theft management device and the second anti-theft management device according to the second embodiment.

FIG. 9 is a flowchart illustrating an example of a sequence of a process executed by each of the first anti-theft management device 200 and the second anti-theft management device 300. Each of the first anti-theft management device 200 and the second anti-theft management device 300, for example, executes the process illustrated in FIG. 9 for every predetermined period.

In the first anti-theft management device 200, the broadcast wave-receiving unit 110 receives theft information using broadcast waves (Step S301). More specifically, the first control unit 290 waits for the broadcast wave-receiving unit 110 to receive the theft information. The first control unit 290 stores the theft information received by the broadcast wave-receiving unit 110 in the first theft information-storing unit 281 of the first storage unit 280.

When the first radio communication unit 220 and the second radio communication unit 320 communicatively connect together, the first radio communication unit 220 transmits theft information to the second radio communication unit 320 in accordance with control of the first control unit 290 (Step S302). More specifically, when the second anti-theft management device 300 located within the communicable range of the first radio communication unit 220 is detected, the first control unit 290 performs control of the first radio communication unit 220 to be communicatively connected to the second anti-theft management device 300. The first control unit 290 transmits (transfers) the theft information stored by the first theft information-storing unit 281 to the second anti-theft management device 300 by controlling the first radio communication unit 220.

The first control unit 290 determines whether or not the first radio communication unit 220 has received notification information (the notification information transmitted by the second anti-theft management device 300 in Step S322) from the second anti-theft management device 300 (Step S303).

In a case in which the first control unit 290 determines that the first radio communication unit 220 has received the notification information from the second anti-theft management device 300 (Step S303: Yes), the first radio communication unit 220 transmits (transfers) the notification information transmitted from the second anti-theft management device 300 to the notification information-acquiring device 700 in accordance with control of the first control unit 290 (Step S304).

After Step S304, the first anti-theft management device 200 ends the process illustrated in FIG. 9.

In a case in which the first control unit 290 determines that the first radio communication unit 220 has not received the notification information transmitted from the second anti-theft management device 300 (Step S303: No), the first anti-theft management device 200 ends the process illustrated in FIG. 9.

In the second anti-theft management device 300, the second radio communication unit 320 receives theft information transmitted from the first anti-theft management device 200 (Step S311). More specifically, the second control unit 390 waits for the second radio communication unit 320 to receive theft information.

The theft-determining unit 191 determines whether or not identification information of its own vehicle is included in the theft information (Step S312). The process of Step S312 is similar to the process of Step S202 illustrated in FIG. 5.

In a case in which the theft-determining unit 191 determines that the identification information of its own vehicle is included in the theft information (Step S312: Yes), the theft-determining unit 191 determines whether or not the second radio communication unit 320 is communicatively connected to a theft notification destination (Step S321). In the second embodiment, the first anti-theft management device 200 that is a transmission source of theft information is a theft notification destination, and the theft-determining unit 191 determines whether or not the second radio communication unit 320 is communicatively connected to the first anti-theft management device 200.

In a case in which the theft-determining unit 191 determines that the second radio communication unit 320 can be communicatively connected to the theft notification destination (Step S321: Yes), the second radio communication unit 320 transmits notification information to the theft notification destination (the first anti-theft management device 200 in the second embodiment) in accordance with control of the second control unit 390 (Step S322).

After Step S322, the second anti-theft management device 300 ends the process illustrated in FIG. 9.

On the other hand, in a case in which the theft-determining unit 191 determines that the second radio communication unit 320 cannot be communicatively connected to the theft notification destination in Step S321 (Step S321: No), the second radio communication unit 320 transmits the notification information to other vehicles located within the communication range of the second radio communication unit 320 in accordance with control of the second control unit 390 (Step S322). The process of Step S322 is similar to the process of Step S214 illustrated in FIG. 5.

After Step S323, the second anti-theft management device 300 ends the process illustrated in FIG. 9.

In a case in which the theft-determining unit 191 determines that the identification information of its own vehicle is not included in the theft information in Step S312 (Step S312: No), the second control unit 390 causes the process to Step S331.

Processes of Steps S331, S341, S342, and S351 are respectively similar to the processes of Steps S221, S231, S232, and S241 illustrated in FIG. 5.

After Step S351, the second anti-theft management device 300 ends the process illustrated in FIG. 9.

As described above, the theft information-transmitting device 800 transmits theft information including identification information of a stolen vehicle using broadcast waves. The first anti-theft management device 200 receives theft information from the theft information-transmitting device 800 and transmits the received theft information to the second anti-theft management device 300. In the second anti-theft management device 300, the second radio communication unit 320 receives theft information from the first anti-theft management device 200. The theft-determining unit 191 determines whether or not the identification information of its own vehicle coincides with the identification information of a stolen vehicle. In a case in which it is determined that the identification information of its own vehicle coincides with the identification information of a stolen vehicle, and the second radio communication unit 320 cannot transfer notification information to the first anti-theft management device 200 that is a transmission source of the theft information, the second radio communication unit 320 transmits the notification information to vehicles located within the communicable range.

Accordingly, the anti-theft management system 2 can acquire effects similar to the effects of the anti-theft management system 1 and the second anti-theft management device 300 can perform determination based on the theft information without including a structure for receiving broadcast waves from the theft information-transmitting device 800. From this viewpoint, the configuration of the second anti-theft management device 300 can be simplified, and the manufacturing cost of the second anti-theft management device 300 can be decreased.

Third Embodiment

In the second embodiment, although a configuration in which the second anti-theft management device performs determination of a theft has been described, the first anti-theft management device may perform determination of a theft. In a third embodiment, a configuration in which a first anti-theft management device performs determination of a theft will be described.

The device configuration of an anti-theft management system according to the third embodiment is similar to the device configuration according to the second embodiment described with reference to FIG. 6. Thus, in the third embodiment, the first anti-theft management device 200 and the second anti-theft management device 300 illustrated in FIG. 6 will be respectively replaced with a first anti-theft management device 400 and a second anti-theft management device 500, and description of the device configuration of the anti-theft management system will be omitted.

Figure 10:
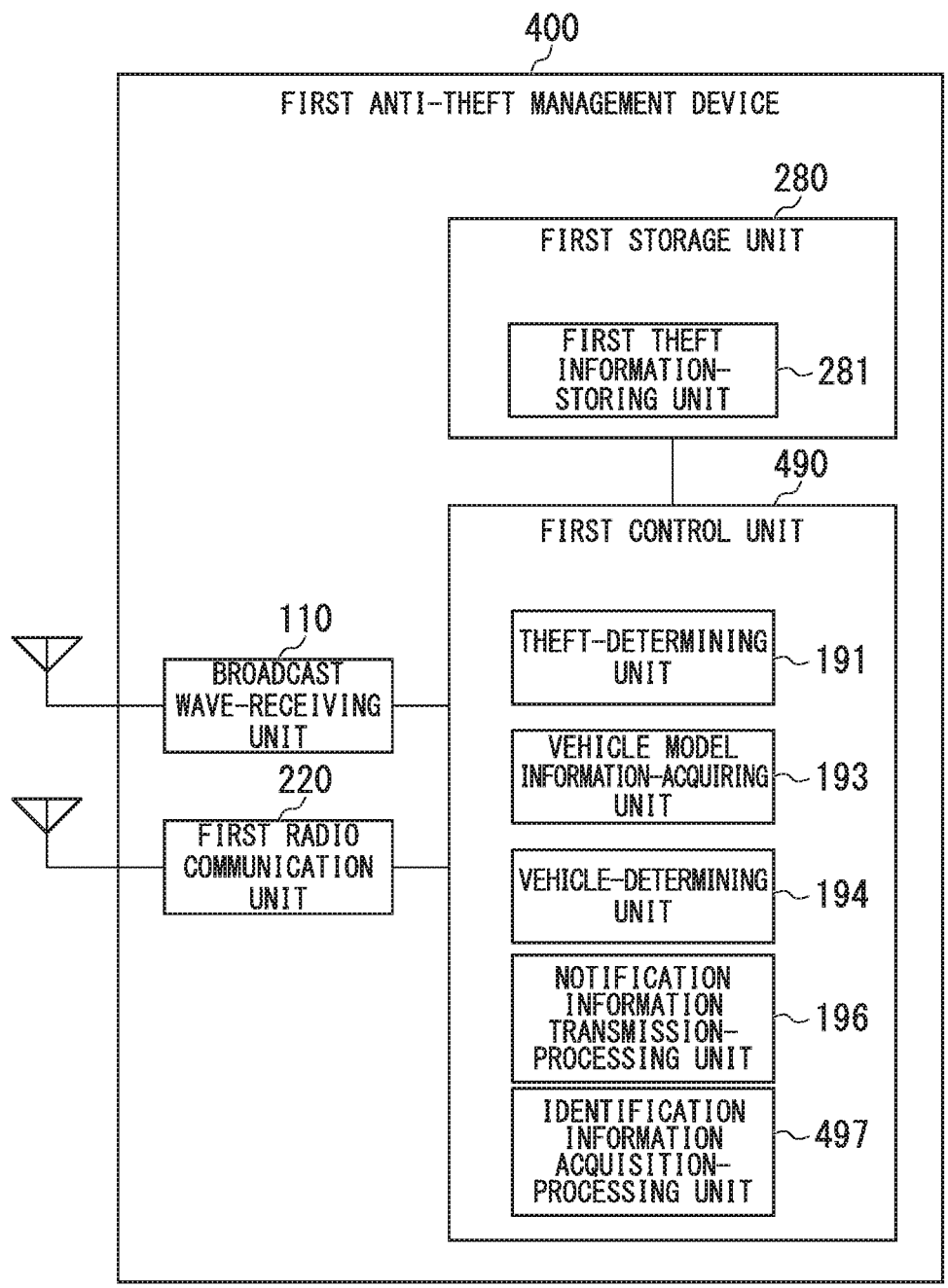
FIG. 10 is a schematic block diagram illustrating a functional configuration of a first anti-theft management device according to a third embodiment of the present invention.

FIG. 10 is a schematic block diagram illustrating the functional configuration of the first anti-theft management device 400. As illustrated in FIG. 10, the first anti-theft management device 400 includes a broadcast wave-receiving unit 110, a first radio communication unit 220, a first storage unit 280 and a first control unit 490. The first storage unit 280 includes a first theft information-storing unit 281. The first control unit 490 includes a theft-determining unit 191, a vehicle model information-acquiring unit 193, a vehicle-determining unit 194, a notification information transmission-processing unit 196 and an identification information acquisition-processing unit 497.

The same reference sign (110, 220, 280 and 281) will be assigned to a part having a similar function in correspondence with each unit illustrated in FIG. 7 among the units illustrated in FIG. 10, and description thereof will be omitted.

The first control unit 490 performs various processes by controlling each unit of the first anti-theft management device 400. Particularly, the first control unit 490 acquires identification information of a vehicle from the second control unit 590 of the second anti-theft management device 500 and determines whether or not the general vehicle 930 in which the second control unit 590 is mounted is a stolen vehicle. In a case in which the first control unit 490 determines that the general vehicle 930 in which the second control unit 590 is mounted is a stolen vehicle, the first control unit 490 transmits notification information to the notification information-acquiring device 700 by controlling the first radio communication unit 220. In a case in which the first radio communication unit 220 cannot transfer notification information to the notification information-acquiring device 700, the first control unit 490 transmits the notification information to vehicles located within the communicable range of the first radio communication unit 220 by controlling the first radio communication unit 220. In this case, a method of determining a vehicle that is a transmission destination of the notification information may be similar to the method according to the first embodiment.

The first control unit 490, for example, is configured by a CPU of a computer included in the first anti-theft management device 400 reading and executing a program stored in the first storage unit 480.

The function of each of the theft-determining unit 191, the vehicle model information-acquiring unit 193, the vehicle-determining unit 194 and the notification information transmission-processing unit 196 is similar to that thereof according to the first embodiment, and the same reference sign as that according to the first embodiment illustrated in FIG. 3 is assigned thereto, and description thereof will be omitted here.

The identification information acquisition-processing unit 497 performs a process of acquiring identification information of a determination target vehicle. More specifically, the identification information acquisition-processing unit 497 transmits a request for transmission of identification information to the second anti-theft management device 500 by controlling the first radio communication unit 220. A general vehicle 930 in which this second anti-theft management device 500 is mounted is a determination target vehicle.

In accordance with control of the identification information acquisition-processing unit 497, the first radio communication unit 220 functions as an identification information request-transmitting unit that transmits a request for transmission of identification information of a vehicle in which the second anti-theft management device 500 is mounted and an identification information-receiving unit that receives the identification information of the vehicle.

Figure 11:
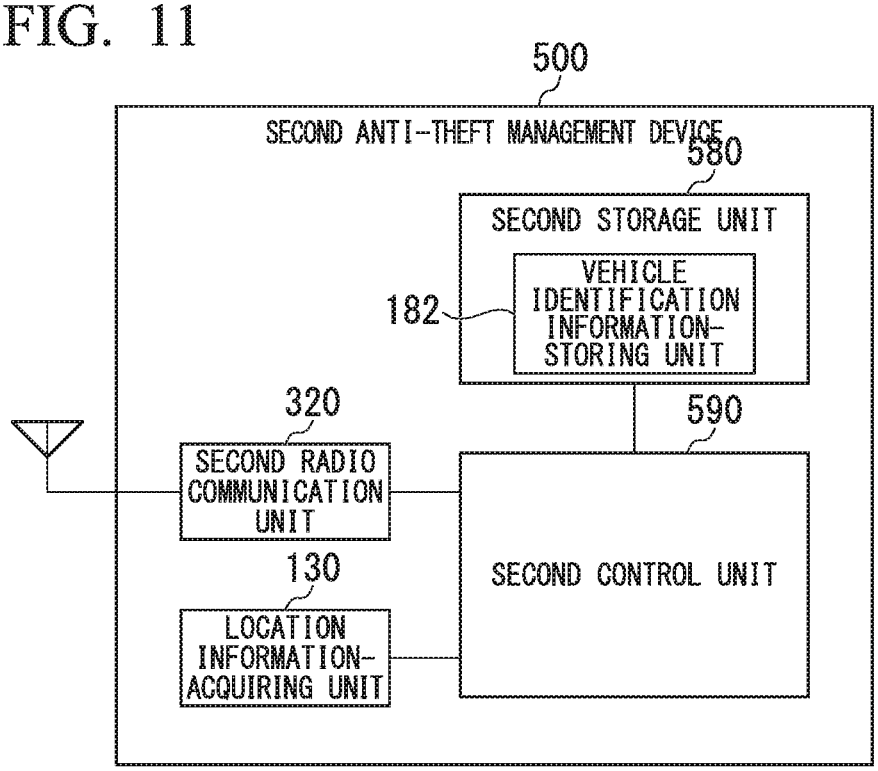
FIG. 11 is a schematic block diagram illustrating a functional configuration of a second anti-theft management device according to the third embodiment.

FIG. 11 is a schematic block diagram illustrating the functional configuration of the second anti-theft management device 500. As illustrated in FIG. 11, the second anti-theft management device 500 includes a second radio communication unit 320, a location information-acquiring unit 130, a second storage unit 580 and a second control unit 590. The second storage unit 580 includes a vehicle identification information-storing unit 182.

The same reference sign (130, 182, and 320) will be assigned to a part having a similar function in correspondence with each unit illustrated in FIG. 8 among the units illustrated in FIG. 11, and description thereof will be omitted.

The second storage unit 580 does not include the second theft information-storing unit 381, which is different from the second storage unit 380 illustrated in FIG. 8. The reason for this is that the second anti-theft management device 500 does not perform determination of a theft, and accordingly, theft information does not need to be stored. Other than that, the second storage unit 580 is similar to the second storage unit 380 illustrated in FIG. 8.

The second control unit 590 executes various processes by controlling each unit of the second anti-theft management device 500. Particularly, the second control unit 590 performs a process of transmitting identification information of the vehicle to the first control unit 490 of the first anti-theft management device 400. More specifically, when the second radio communication unit 320 receives a request for transmission of identification information from the first anti-theft management device 400, the second control unit 590 reads the identification information of its own vehicle (a general vehicle 930 in which the second anti-theft management device 500 including the second radio communication unit 320 is mounted) from the vehicle identification information-storing unit 182. The second control unit 590 transmits the read identification information to the first control unit 490 that is a transmission source of the transmission request by controlling the second radio communication unit 320.

Operations of the first anti-theft management device 400 and the second anti-theft management device 500 will be described with reference to FIG. 12.

Figure 12:
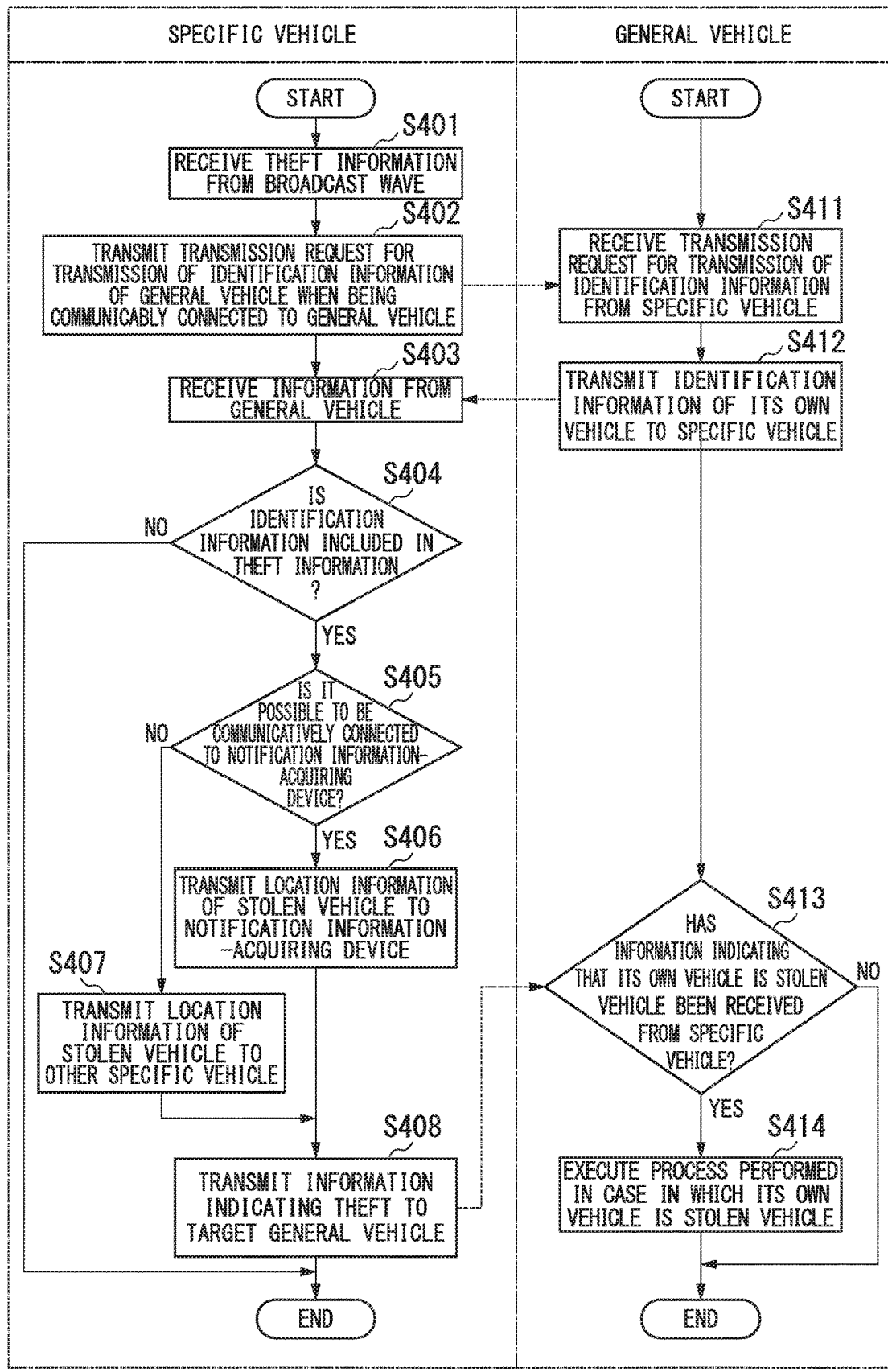
FIG. 12 is a flowchart illustrating an example of a sequence of a process executed by each of the first anti-theft management device and the second anti-theft management device according to the third embodiment.

FIG. 12 is a flowchart illustrating an example of the sequence of a process executed by each of the first anti-theft management device 400 and the second anti-theft management device 500. Each of the first anti-theft management device 400 mounted in the specific vehicle 920 and the second anti-theft management device 500 mounted in the general vehicle 930, for example, performs the process illustrated in FIG. 12 for every predetermined period.

In the first anti-theft management device 400, the broadcast wave-receiving unit 110 receives theft information using broadcast waves (Step S401). The process of Step S401 is similar to the process of Step S301 illustrated in FIG. 9.

The first radio communication unit 220 transmits a request for transmission of identification information of a determination target vehicle to the second radio communication unit 320 in accordance with control of the first control unit 490 (Step S402). In the third embodiment, the determination target vehicle is the general vehicle 930 in which the second anti-theft management device 500 including the second radio communication unit 320 is mounted.

When the first radio communication unit 220 receives identification information transmitted from the second anti-theft management device 500 (Step S403), the theft-determining unit 191 determines whether or not the identification information is included in the theft information (Step S404). The process of Step S404 is similar to the process of Step S202 illustrated in FIG. 5.

In a case in which the theft-determining unit 191 determines that the identification information is not included in the theft information (Step S404: No), the first anti-theft management device 400 ends the process illustrated in FIG. 12.

On the other hand, in a case in which the theft-determining unit 191 determines that the identification information is included in the theft information (Step S404: Yes), the theft-determining unit 191 determines whether or not the first radio communication unit 220 can be communicatively connected to a theft notification destination (Step S405). In the third embodiment, the notification information-acquiring device 700 is the theft notification destination, and the theft-determining unit 191 determines whether or not the first radio communication unit 220 can be communicatively connected to the notification information-acquiring device 700.

In a case in which the theft-determining unit 191 determines that the first radio communication unit 220 can be communicatively connected to the theft notification destination (Step S405: Yes), the first radio communication unit 220 transmits notification information to a theft notification destination (the notification information-acquiring device 700 in the third embodiment) in accordance with control of the first control unit 490 (Step S406).

In addition, the first radio communication unit 220 transmits information representing that the determination target vehicle has been stolen to the second anti-theft management device 500 that is a transmission source of the identification information in accordance with control of the first control unit 490 (Step S408).

After Step S408, the first anti-theft management device 400 ends the process illustrated in FIG. 12.

In a case in which the theft-determining unit 191 determines that the first radio communication unit 220 cannot be communicatively connected to the theft notification destination in Step S405 (Step S405: No), the first radio communication unit 220 transmits notification information to vehicles located within the communication range of the first radio communication unit 220 in accordance with control of the first control unit 490 (Step S407). In this case, a method of selecting a vehicle that is a transmission destination of notification information by the first anti-theft management device 400 is similar to the method according to Embodiment I (the method of Step S214 illustrated in FIG. 5).

After Step S407, the first anti-theft management device 400 causes the process to proceed to Step S408.

In the second anti-theft management device 500, the second radio communication unit 320 receives a request for transmission of identification information (a transmission request transmitted by the first radio communication unit 220 in Step S402) transmitted from the first anti-theft management device 400 (Step S411).

The second radio communication unit 320 transmits (replies) the identification information of its own vehicle to the first anti-theft management device 400 in accordance with control of the second control unit 590 (Step S412).

The second control unit 590 determines whether or not the second radio communication unit 320 has received information representing that its own vehicle is a stolen vehicle (the information transmitted by the first radio communication unit 220 in Step S408) (Step S413).

In a case in which the second control unit 590 determines that the information representing that its own vehicle is a stolen vehicle has not been received (Step S413: No), the second anti-theft management device 500 ends the process illustrated in FIG. 12.

On the other hand, in a case in which the second control unit 590 determines that the information representing that its own vehicle is a stolen vehicle has been received (Step S413: Yes), the second control unit 590 executes a process performed in a case in which its own vehicle is a stolen vehicle (Step S414). For example, the second control unit 590 sounds a horn of its own vehicle or a siren used for notifying of a theft, thereby notifying persons in the vicinity of its own vehicle that its own vehicle is a stolen vehicle. Alternatively, the second control unit 590 may form a state in which its own vehicle cannot be driven or a state in which it is difficult to drive its own vehicle by causing the engine of its own vehicle not to be able to be started.

After Step S414, the second anti-theft management device 500 ends the process illustrated in FIG. 12.

As described above, the theft information-transmitting device 800 transmits theft information including the identification information of a stolen vehicle using broadcast waves. In the first anti-theft management device 400, the broadcast wave-receiving unit 110 receives theft information from the theft information-transmitting device 800. The first radio communication unit 220 transmits a request for transmission of identification information of a determination target vehicle (the general vehicle 930 in which the second anti-theft management device 500 is mounted) and receives identification information from the second anti-theft management device 500. The theft-determining unit 191 determines whether or not the identification information of the determination target vehicle coincides with the identification information of a stolen vehicle. In a case in which the theft-determining unit 191 determines that the identification information of the determination target vehicle coincides with the identification information of a stolen vehicle, and the first radio communication unit 220 cannot transfer notification information to a set theft notification destination (the notification information-acquiring device 700), the first anti-theft management device 400 transmits the notification information to vehicles located within the communicable range. In addition, the second anti-theft management device 500 transmits the identification information of its own vehicle to the first anti-theft management device 400 that is a transmission request source on the basis of the transmission request from the first anti-theft management device 400.

Accordingly, the anti-theft management system 2 according to the third embodiment can acquire effects that are similar to the effects of the anti-theft management system 1. In addition, the second anti-theft management device 500 does not need to include a structure for receiving broadcast waves from the theft information-transmitting device 800 and a structure for performing determination of a stolen vehicle. From this viewpoint, the configuration of the second anti-theft management device 500 can be simplified, and the manufacturing cost of the second anti-theft management device 500 can be decreased.

A minimal configuration of the present invention will be described with reference to FIGS. 13 to 16.

Figure 13:
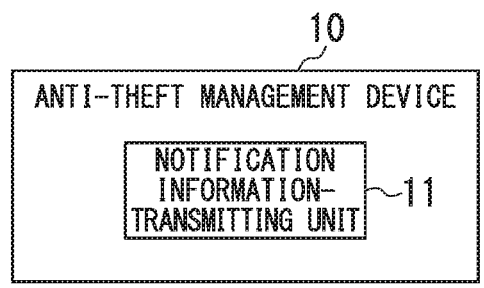
FIG. 13 is a schematic configuration diagram illustrating a minimal configuration of an anti-theft management device according to the present invention.

FIG. 13 is a schematic configuration diagram illustrating a minimal configuration of the anti-theft management device according to the present invention. The anti-theft management device 10 illustrated in FIG. 13 includes a notification information-transmitting unit 11.

In such a configuration, in a case in which it is determined that the identification information of a determination target vehicle coincides with the identification information of a stolen vehicle on the basis of the theft information including the identification information of a stolen vehicle, and the notification information-transmitting unit 11 cannot transfer the notification information to a set theft notification destination, the notification information-transmitting unit 11 transmits the notification information to vehicles located within the communicable range.

In accordance with this, even in a case in which the anti-theft management device 10 cannot establish communication with the theft notification destination, the anti-theft management device 10 can notify that the vehicle has been stolen.

Figure 14:
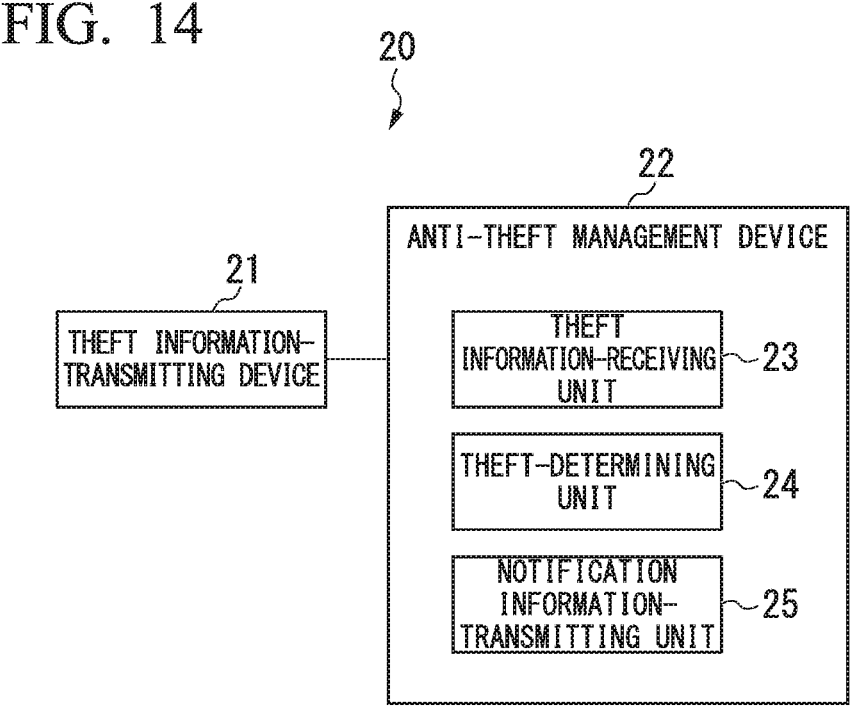
FIG. 14 is a schematic configuration diagram illustrating a first example of a minimal configuration of an anti-theft management system according to the present invention.

FIG. 14 is a schematic configuration diagram illustrating a first example of a minimal configuration of an anti-theft management system according to the present invention. The anti-theft management system 20 illustrated in FIG. 14 includes a theft information-transmitting device 21 and an anti-theft management device 22. The anti-theft management device 22 includes a theft information-receiving unit 23, a theft-determining unit 24 and a notification information-transmitting unit 25.

In such a configuration, the theft information-transmitting device 21 transmits theft information including identification information of a stolen vehicle. In the anti-theft management device 22, the theft information-receiving unit 23 receives theft information. The theft-determining unit 24 determines whether or not identification information of its own vehicle in which the anti-theft management device 22 is mounted coincides with the identification information of a stolen vehicle. In a case in which it is determined that the identification information of its own vehicle coincides with the identification information of a stolen vehicle, and the notification information-transmitting unit 25 cannot transfer notification information to a set theft notification destination, the notification information-transmitting unit 25 transmits the notification information to vehicles located within the communicable range.

Accordingly, in the anti-theft management system 20, even in a case in which the anti-theft management device 22 cannot establish communication with the theft notification destination, the anti-theft management device 22 can notify that the vehicle has been stolen.

Figure 15:
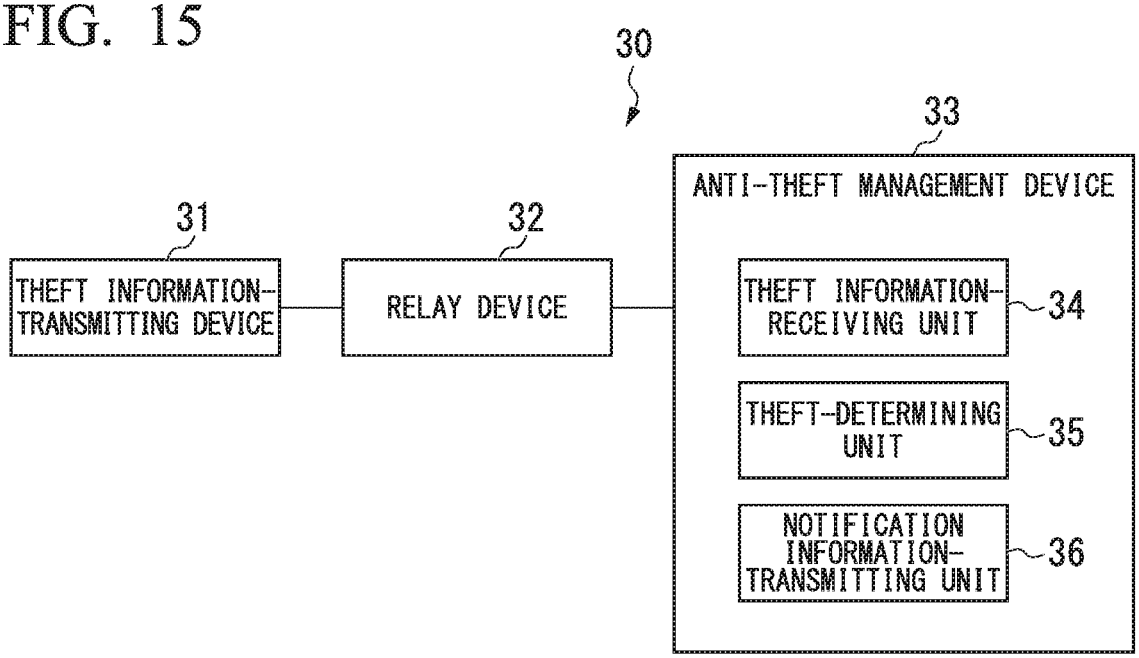
FIG. 15 is a schematic configuration diagram illustrating a second example of a minimal configuration of an anti-theft management system according to the present invention.

FIG. 15 is a schematic configuration diagram illustrating a second example of a minimal configuration of an anti-theft management system according to the present invention. The anti-theft management system 30 illustrated in FIG. 15 includes a theft information-transmitting device 31, a relay device 32 and an anti-theft management device 33. The anti-theft management device 33 includes a theft information-receiving unit 34, a theft-determining unit 35 and a notification information-transmitting unit 36.

In such a configuration, the theft information-transmitting device 31 transmits theft information including the identification information of a stolen vehicle using broadcast waves. The relay device 32 receives theft information from the theft information-transmitting device 31 and transmits the theft information to the anti-theft management device 33. In the anti-theft management device 33, the theft information-receiving unit 34 receives theft information from the relay device 32. The theft-determining unit 35 determines whether or not the identification information of its own vehicle that is a vehicle in which the anti-theft management device 33 is mounted coincides with the identification information of a stolen vehicle. In a case in which it is determined that the identification information of its own vehicle coincides with the identification information of a stolen vehicle, and the notification information-transmitting unit 36 cannot transfer notification information to a set theft notification destination, the notification information-transmitting unit 36 transmits the notification information to vehicles located within the communicable range.

Accordingly, in the anti-theft management system 30, even in a case in which the anti-theft management device 33 cannot establish communication with the theft notification destination, the anti-theft management device 33 can notify that the vehicle has been stolen. In addition, the anti-theft management device 33 does not need to include a structure for receiving broadcast waves. From this viewpoint, the configuration of the anti-theft management device 33 can be simplified, and the manufacturing cost of the anti-theft management device 33 can be decreased.

Figure 16:
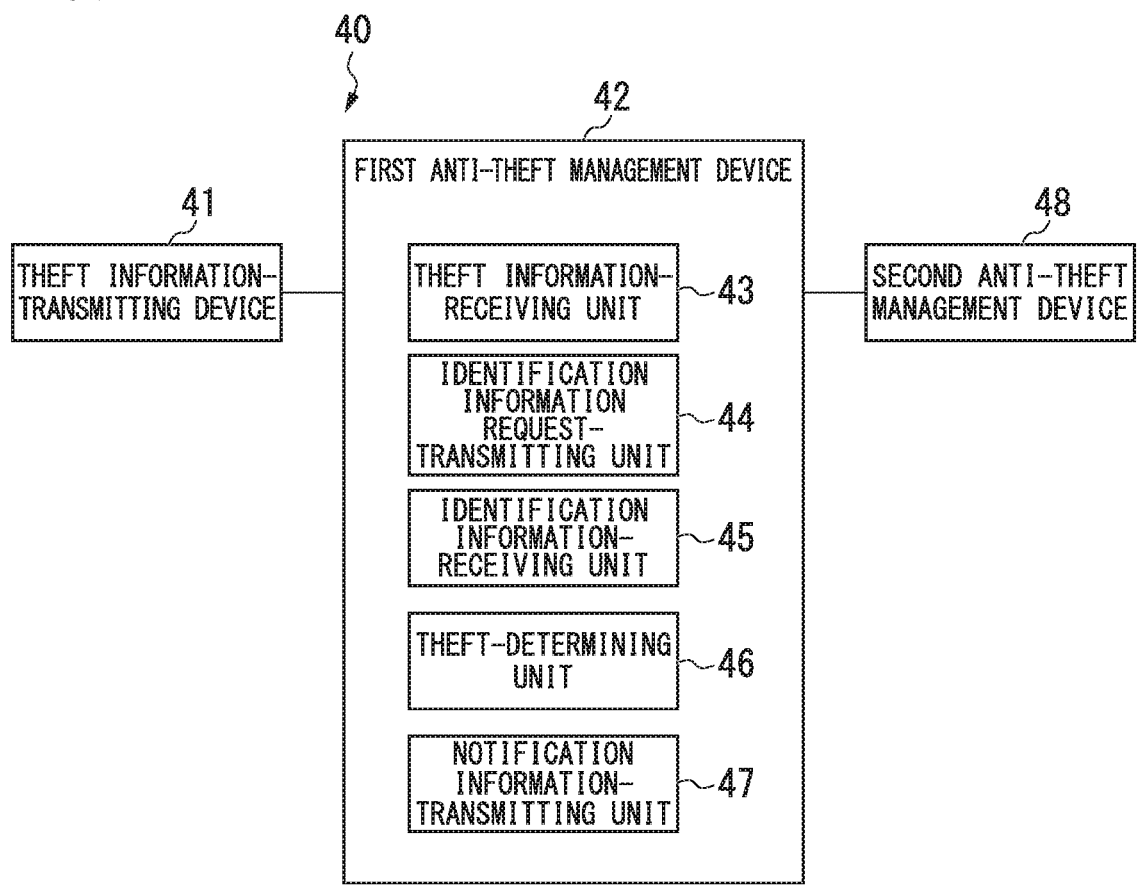
FIG. 16 is a schematic configuration diagram illustrating a third example of a minimal configuration of an anti-theft management system according to the present invention.

FIG. 16 is a schematic configuration diagram illustrating a third example of a minimal configuration of an anti-theft management system according to the present invention. The anti-theft management system 40 illustrated in FIG. 16 includes a theft information-transmitting device 41, a first anti-theft management device 42 and a second anti-theft management device 48. The first anti-theft management device 42 includes a theft information-receiving unit 43, an identification information request-transmitting unit 44, an identification information-receiving unit 45, a theft-determining unit 46 and a notification information-transmitting unit 47.

In such a configuration, the theft information-transmitting device 41 transmits theft information including identification information of a stolen vehicle using broadcast waves. In the first anti-theft management device 42, the theft information-receiving unit 43 receives theft information. The identification information request-transmitting unit 44 transmits a request for transmission of identification information of a vehicle in which the second anti-theft management device 48 is mounted. The identification information-receiving unit 45 receives the identification information of the vehicle in which the second anti-theft management device 48 is mounted. The theft-determining unit 46 determines whether or not the identification information of the vehicle in which the second anti-theft management device 48 is mounted coincides with the identification information of a stolen vehicle. In a case in which it is determined that the identification information of the vehicle in which the second anti-theft management device 48 is mounted coincides with the identification information of a stolen vehicle, and the notification information-transmitting unit 47 cannot transfer notification information to a set theft notification destination, the notification information-transmitting unit 47 transmits the notification information to vehicles located within the communicable range. In addition, the second anti-theft management device 48 transmits the identification information of the vehicle in which the second anti-theft management device 48 is mounted to the first anti-theft management device 42 on the basis of a transmission request.

In this way, in the anti-theft management system 40, even in a case in which the first anti-theft management device 42 cannot establish communication with a theft notification destination, the first anti-theft management device 42 can notify that the vehicle has been stolen. The second anti-theft management device 48 does not need to include a structure for receiving broadcast waves and a structure for performing determination of a stolen vehicle. From this viewpoint, the configuration of the second anti-theft management device 48 can be simplified, and the manufacturing cost of the second anti-theft management device 48 can be decreased.

In addition, the process of each unit may be performed by recording a program used for realizing all or some of the functions of the control unit 190, the first control units 290 and 490, the second control units 390 and 590, and the transmitting-device-side control unit 890 on a computer-readable recording medium, reading the program recorded on the recording medium into a computer system, and executing the program. In addition, a "computer system" described here includes an OS and hardware such as peripherals.

Furthermore, a "computer-readable recording medium" represents a portable medium such as a flexible disk, a magneto-optical disk, a ROM, or a CD-ROM or a storage device such as a hard disk built in the computer system. In addition, the program described above may be for realizing some of the functions described above or may realize the function described above in combination with a program recorded in the computer system in advance.

As above, while the embodiments of the present invention have been described in detail with reference to the drawings, a specific configuration is not limited to these embodiments and includes design and the like in a range not departing from the concept of the present invention.

Some or all of the embodiments described above may be also described as the following supplementary notes but are not limited thereto.

(Supplementary Note 1)

An anti-theft management device includes a notification information-transmitting unit that transmits notification information to vehicles located within a communicable range when the notification information is not able to be transferred to a set theft notification destination and when it is determined that identification information of a determination target vehicle coincides with identification information of a stolen vehicle on the basis of theft information including the identification information of the stolen vehicle.

(Supplementary Note 2)

The anti-theft management device according to Supplementary note 1, further includes: a theft information-receiving unit that receives the theft information; and a theft-determining unit that determines whether or not identification information of its own vehicle that is the determination target vehicle coincides with the identification information of the stolen vehicle, wherein the notification information-transmitting unit transmits the notification information to the vehicle located within the communicable range when the theft-determining unit determines that the identification information of its own vehicle coincides with the identification information of the stolen vehicle and when the notification information is not able to be transferred to the set theft notification destination.

(Supplementary Note 3)

The anti-theft management device according to Supplementary note 2, further includes: a theft information-storing unit that stores the theft information received by the theft information-receiving unit; a location-determining unit that determines whether or not its own vehicle is located within a reception area of the theft information; and a theft information-transmitting unit that transmits the theft information stored by the theft information-storing unit to other vehicles when the location-determining unit determines that its own vehicle is located outside the reception area of the theft information.

(Supplementary Note 4)

The anti-theft management device according to Supplementary note 1, further includes: a theft information-receiving unit that receives the theft information; an identification information request-transmitting unit that transmits a request for transmission of identification information to the determination target vehicle; an identification information-receiving unit that receives the identification information of the determination target vehicle; and a theft-determining unit that determines whether or not the identification information of the determination target vehicle coincides with the identification information of the stolen vehicle, wherein the notification information-transmitting unit transmits the notification information to the vehicle located within the communicable range when the theft-determining unit determines that the identification information of the determination target vehicle coincides with the identification information of the stolen vehicle and when the notification information is not able to be transferred to the set theft notification destination.

(Supplementary Note 5)

The anti-theft management device according to any one of Supplementary notes 2 to 4, wherein the theft information-receiving unit receives the theft information using broadcast waves.

(Supplementary Note 6)

The anti-theft management device according to any one of Supplementary notes 1 to 5, further includes: a vehicle model information-acquiring unit that acquires vehicle model information representing notification information transmission target vehicle model, the vehicle model information being used in a case in which the notification information is not able to be transferred to the theft notification destination, wherein the notification information-transmitting unit transmits the notification information to vehicles of a vehicle model represented by the vehicle model information when the notification information is not able to be transferred to the theft notification destination.

(Supplementary Note 7)

The anti-theft management device according to any one of Supplementary notes 1 to 6, further includes: a vehicle-determining unit that determines a notification information transmission target vehicle on the basis of a location of the set theft notification destination and a location of its own vehicle, wherein the notification information-transmitting unit transmits the notification information to a vehicle determined by the vehicle-determining unit in a case in which the notification information is not able to be transferred to the theft notification destination.

(Supplementary Note 8)

The anti-theft management device according to Supplementary note 1, further includes: a theft-determining unit that determines whether or not identification information of a vehicle captured by a camera coincides with the identification information of the stolen vehicle included in the notification information, wherein the notification information-transmitting unit transmits notification information indicating that the vehicle captured by the camera is a stolen vehicle to the vehicle located within the communicable range when the theft-determining unit determines that the identification information coincides with the identification information of the stolen vehicle, and the notification information is not able to be transferred to the theft notification destination.

(Supplementary Note 9)

The anti-theft management device according to any one of Supplementary notes 1 to 8, further includes: a notification information-receiving unit that receives notification information transmitted from other vehicles, wherein the notification information-transmitting unit transmits the notification information to the vehicle located within the communicable range when the notification information received by the notification information-receiving unit is not able to be transferred to the set theft notification destination.

(Supplementary Note 10)

An anti-theft management system is provided, including: a theft information-transmitting device; and an anti-theft management device, wherein the theft information-transmitting device transmits theft information including identification information of a stolen vehicle, and the anti-theft management device includes a theft information-receiving unit that receives the theft information; a theft-determining unit that determines whether or not identification information of its own vehicle in which the anti-theft management device is mounted coincides with the identification information of the stolen vehicle, and a notification information-transmitting unit that transmits notification information to a vehicle located within a communicable range when it is determined that identification information of its own vehicle coincides with the identification information of the stolen vehicle and when the notification information is not able to be transferred to a set theft notification destination.

(Supplementary Note 11)

An anti-theft management system is provided, including: a theft information-transmitting device; a relay device; and an anti-theft management device, wherein the theft information-transmitting device transmits theft information including identification information of a stolen vehicle using broadcast waves, the relay device receives the theft information from the theft information-transmitting device and relays the received theft information to the anti-theft management device, and the anti-theft management device includes a theft information-receiving unit that receives the theft information from the relay device, a theft-determining unit that determines whether or not identification information of its own vehicle in which the anti-theft management device is mounted coincides with the identification information of the stolen vehicle; and a notification information-transmitting unit that transmits notification information to vehicles located within a communicable range when it is determined that identification information of its own vehicle coincides with the identification information of the stolen vehicle and when the notification information is not able to be transferred to a set theft notification destination.

(Supplementary Note 12)

An anti-theft management system is provided, including: a theft information-transmitting device; a first anti-theft management device; and a second anti-theft management device. The theft information-transmitting device transmits theft information including identification information of a stolen vehicle using broadcast waves, and the first anti-theft management device includes: a theft information-receiving unit that receives the theft information; an identification information request-transmitting unit that transmits a transmission request for transmission of identification information of a vehicle in which the second anti-theft management device is mounted; an identification information-receiving unit that receives the identification information of the vehicle in which the second anti-theft management device is mounted; a theft-determining unit that determines whether or not the identification information of the vehicle in which the second anti-theft management device is mounted coincides with the identification information of the stolen vehicle; and a notification information-transmitting unit that transmits notification information to a vehicle located within a communicable range when it is determined that the identification information of the vehicle in which the second anti-theft management device is mounted coincides with the identification information of the stolen vehicle and when the notification information is not able to be transferred to a set theft notification destination. The second anti-theft management device transmits the identification information of the vehicle in which the second anti-theft management device is mounted to the first anti-theft management device on the basis of the transmission request.

(Supplementary Note 13)

An anti-theft management method is performed by an anti-theft management device. The anti-theft management method includes: transmitting notification information to vehicles located within a communicable range when the notification information is not able to be transferred to a set theft notification destination and when it is determined that identification information of a determination target vehicle coincides with identification information of a stolen vehicle on the basis of theft information including the identification information of the stolen vehicle.

(Supplementary Note 14)

A program causes a computer to execute a process of transmitting notification information to a vehicle located within a communicable range when the notification information is not able to be transferred to a set theft notification destination and when it is determined that identification information of a determination target vehicle coincides with identification information of a stolen vehicle on the basis of theft information including the identification information of the stolen vehicle.

INDUSTRIAL APPLICABILITY

The present invention can be applied to a use in which it is necessary to notify that a vehicle is stolen even in a case in which a device that has detected a theft of a vehicle cannot establish communication with a set theft notification destination.

REFERENCE SIGNS LIST 1, 2 Anti-theft management system
100 Anti-theft management device
110 Broadcast wave-receiving unit
120 Radio communication unit
130 Location information-acquiring unit
180 Storage unit
181 Theft information-storing unit
182 Vehicle identification information-storing unit
190 Control unit
191 Theft-determining unit
192 Location-determining unit
193 Vehicle model information-acquiring unit
194 Vehicle-determining unit
195 Theft information transmission-processing unit
196 Notification information transmission-processing unit
200 First anti-theft management device
220 First radio communication unit
280 First storage unit
281 First theft information-storing unit
290 First control unit
300 Second anti-theft management device
320 Second radio communication unit
380 Second storage unit
381 Second theft information-storing unit
390 Second control unit
400 First anti-theft management device
480 First storage unit
490 First control unit
497 Identification information acquisition-processing unit
500 Second anti-theft management device
580 Second storage unit
590 Second control unit
700 Notification information-acquiring device
800 Theft information-transmitting device
810 Broadcast wave-transmitting unit
820 Information-acquiring unit
880 Transmitting-device-side storage unit
881 Transmitting-device-side theft information-storing unit
890 Transmitting-device-side control unit
910 Vehicle
920 Specific vehicle
930 General vehicle

The invention claimed is:

1. An anti-theft management device comprising a notification information-transmitting unit that transmits notification information to a vehicle located within a communicable range when the notification information is not able to be transferred to a set theft notification destination and when it is determined that identification information of a determination target vehicle coincides with identification information of a stolen vehicle on a basis of theft information including the identification information of the stolen vehicle.

2. The anti-theft management device according to claim 1, further comprising:
 a theft information-receiving unit that receives the theft information; and
 a theft-determining unit that determines whether or not identification information of its own vehicle that is the determination target vehicle coincides with the identification information of the stolen vehicle,
 wherein the notification information-transmitting unit transmits the notification information to the vehicle located within the communicable range when the theft-determining unit determines that the identification information of its own vehicle coincides with the identification information of the stolen vehicle and when the notification information is not able to be transferred to the set theft notification destination.

3. The anti-theft management device according to claim 2, wherein the theft information-receiving unit receives the theft information using broadcast waves.

4. The anti-theft management device according to claim 2, further comprising:

a theft information-storing unit that stores the theft information received by the theft information-receiving unit;

a location-determining unit that determines whether or not its own vehicle is located within a reception area of the theft information; and a theft information-transmitting unit that transmits the theft information stored by the theft information-storing unit to other vehicles when the location-determining unit determines that its own vehicle is located outside the reception area of the theft information.

5. The anti-theft management device according to claim 1, further comprising:

a theft information-receiving unit that receives the theft information;

an identification information request-transmitting unit that transmits a request for transmission of identification information to the determination target vehicle;

an identification information-receiving unit that receives the identification information of the determination target vehicle; and a theft-determining unit that determines whether or not the identification information of the determination target vehicle coincides with the identification information of the stolen vehicle, wherein the notification information-transmitting unit transmits the notification information to the vehicle located within the communicable range when the theft-determining unit determines that the identification information of the determination target vehicle coincides with the identification information of the stolen vehicle and when the notification information is not able to be transferred to the set theft notification destination.

6. The anti-theft management device according to claim 1, further comprising:

a vehicle model information-acquiring unit that acquires vehicle model information representing notification information transmission target vehicle model, the vehicle model information being used in a case in which the notification information is not able to be transferred to the theft notification destination, wherein the notification information-transmitting unit transmits the notification information to a vehicle of a vehicle model represented by the vehicle model information when the notification information is not able to be transferred to the theft notification destination.

7. The anti-theft management device according to claim 1, further comprising:

a vehicle-determining unit that determines a notification information transmission target vehicle on a basis of a location of the set theft notification destination and a location of its own vehicle, wherein the notification information-transmitting unit transmits the notification information to a vehicle determined by the vehicle-determining unit in a case in which the notification information is not able to be transferred to the theft notification destination.

8. The anti-theft management device according to claim 1, further comprising:

a theft-determining unit that determines whether or not identification information of a vehicle captured by a camera coincides with the identification information of the stolen vehicle included in the notification information, wherein the notification information-transmitting unit transmits notification information indicating that the vehicle captured by the camera is a stolen vehicle to the vehicle located within the communicable range when the theft-determining unit determines that the identification information coincides with the identification information of the stolen vehicle and when the notification information is not able to be transferred to the theft notification destination.

9. The anti-theft management device according to claim 1, further comprising:

a notification information-receiving unit that receives notification information transmitted from other vehicles, wherein the notification information-transmitting unit transmits the notification information to the vehicle located within the communicable range when the notification information received by the notification information-receiving unit is not able to be transferred to the set theft notification destination.

10. An anti-theft management system comprising:

a theft information-transmitting device; and an anti-theft management device, wherein the theft information-transmitting device transmits theft information including identification information of a stolen vehicle, and wherein the anti-theft management device includes:

a theft information-receiving unit that receives the theft information;

a theft-determining unit that determines whether or not identification information of its own vehicle in which the anti-theft management device is mounted coincides with the identification information of the stolen vehicle; and a notification information-transmitting unit that transmits notification information to a vehicle located within a communicable range when it is determined that identification information of its own vehicle coincides with the identification information of the stolen vehicle and when the notification information is not able to be transferred to a set theft notification destination.

11. An anti-theft management method by an anti-theft management device, the anti-theft management method comprising transmitting notification information to a vehicle located within a communicable range when the notification information is not able to be transferred to a set theft notification destination and when it is determined that identification information of a determination target vehicle coincides with identification information of a stolen vehicle on a basis of theft information including the identification information of the stolen vehicle.

* * * * *